(12) United States Patent
Darmawikarta et al.

(10) Patent No.: US 12,546,957 B2
(45) Date of Patent: Feb. 10, 2026

(54) PHOTONIC INTEGRATED CIRCUIT PACKAGING ARCHITECTURES

(71) Applicant: Intel Corporation, Santa Clara, CA (US)

(72) Inventors: Kristof Kuwawi Darmawikarta, Chandler, AZ (US); Benjamin T. Duong, Phoenix, AZ (US); Srinivas V. Pietambaram, Chandler, AZ (US); Tarek A. Ibrahim, Mesa, AZ (US); Ala Omer, Phoenix, AZ (US); Bai Nie, Chandler, AZ (US); Hari Mahalingam, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 909 days.

(21) Appl. No.: 17/552,169

(22) Filed: Dec. 15, 2021

(65) Prior Publication Data

US 2023/0185033 A1  Jun. 15, 2023

(51) Int. Cl.
G02B 6/12 (2006.01)
G02B 6/42 (2006.01)
G02B 6/43 (2006.01)

(52) U.S. Cl.
CPC ......... *G02B 6/4212* (2013.01); *G02B 6/4239* (2013.01); *G02B 6/43* (2013.01)

(58) Field of Classification Search
CPC ...... G02B 6/4212; G02B 6/4239; G02B 6/43; G02B 6/12004; G02B 6/428; G02B 6/12
See application file for complete search history.

(56) References Cited

U.S. PATENT DOCUMENTS 8,805,130 B2 * 8/2014 Lipson ................ G02F 1/3132
385/24
9,841,560 B2 * 12/2017 Welch .................... H04B 10/40
(Continued)

FOREIGN PATENT DOCUMENTS

KR  1020170117557 A  10/2017
WO  2013048411 A1  4/2013

OTHER PUBLICATIONS

U.S. Appl. No. 17/237,375, filed Apr. 22, 2021, Photonic Integrated Circuit Packaging Architecture.
(Continued)

*Primary Examiner* — Jennifer Doan
(74) *Attorney, Agent, or Firm* — Akona IP PC

(57) ABSTRACT

Microelectronic assemblies including photonic integrated circuits (PICs), related devices and methods, are disclosed herein. For example, in some embodiments, a photonic assembly may include an integrated circuit (IC) in a first layer, wherein the first layer includes a substrate having a first surface, an opposing second surface, and a lateral surface substantially perpendicular to the first and second surfaces, wherein the substrate includes a waveguide between the first and second surfaces, and wherein and the IC is nested in a cavity in the substrate; a PIC in a second layer, wherein the second layer is on the first layer and an active surface of the PIC faces the first layer, and wherein the IC is electrically coupled to the active side of the PIC; and an optical component optically coupled to the active surface of the PIC and the waveguide in the substrate at the second surface.

18 Claims, 10 Drawing Sheets

(56) References Cited

U.S. PATENT DOCUMENTS

| | | |
|---|---|---|
| 10,598,875 B2 | 3/2020 | Xie |
| 2013/0279844 A1 | 10/2013 | Na et al. |
| 2014/0376857 A1 | 12/2014 | Chantre et al. |
| 2021/0041649 A1 | 2/2021 | Brusberg et al. |

OTHER PUBLICATIONS

U.S. Appl. No. 17/482,175, filed Sep. 22, 2021, Photonic Integrated Circuit Packaging Architectures.

U.S. Appl. No. 17/482,213, filed Sep. 22, 2021, Photonic Integrated Circuit Packaging Architectures Photonic Integrated Circuit Packaging Architectures.

U.S. Appl. No. 17/482,234, filed Sep. 22, 2021, Photonic Integrated Circuit Packaging Architectures.

U.S. Appl. No. 17/482,283, filed Sep. 22, 2021, Photonic Integrated Circuit Packaging Architectures.

U.S. Appl. No. 17/482,295, filed Sep. 22, 2021, Photonic Integrated Circuit Packaging Architectures.

U.S. Appl. No. 17/482,311, filed Sep. 22, 2021, Photonic Integrated Circuit Packaging Architectures.

\* cited by examiner

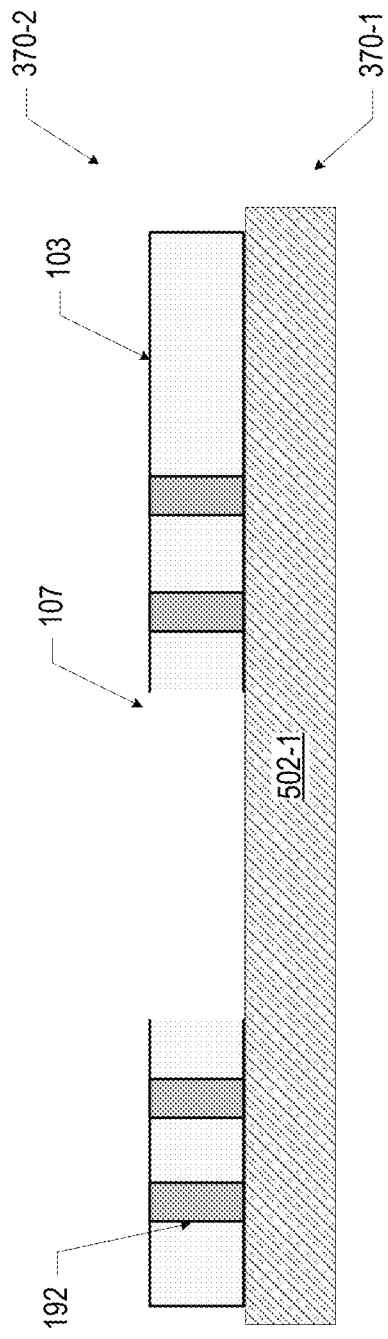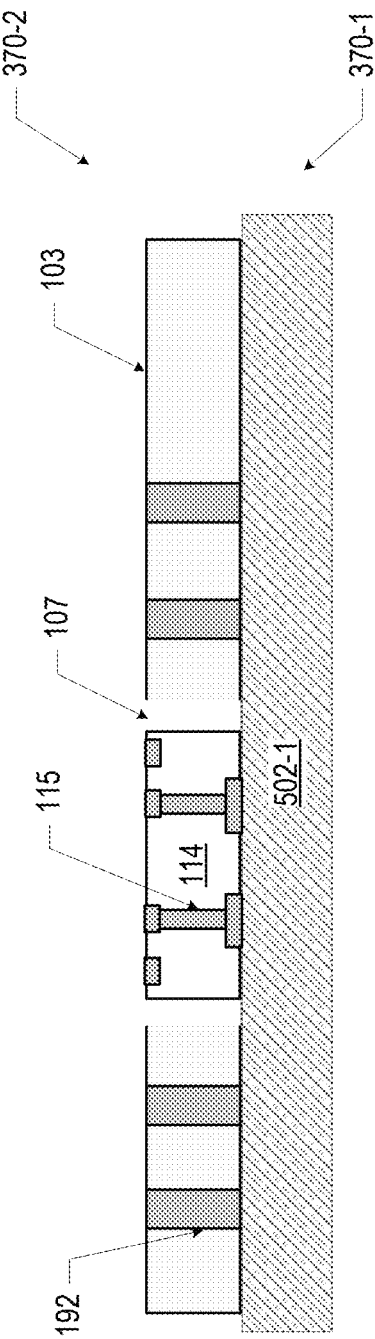
FIG. 3A
FIG. 3B

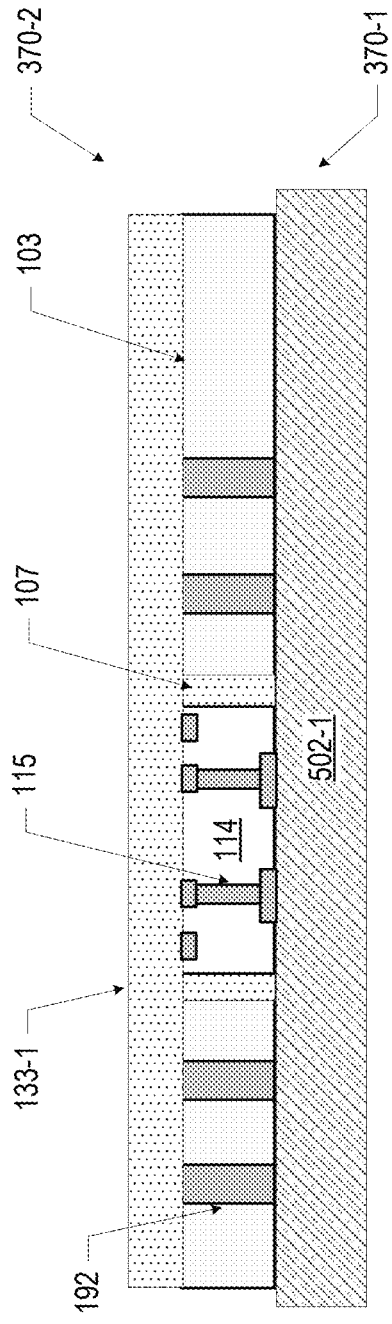
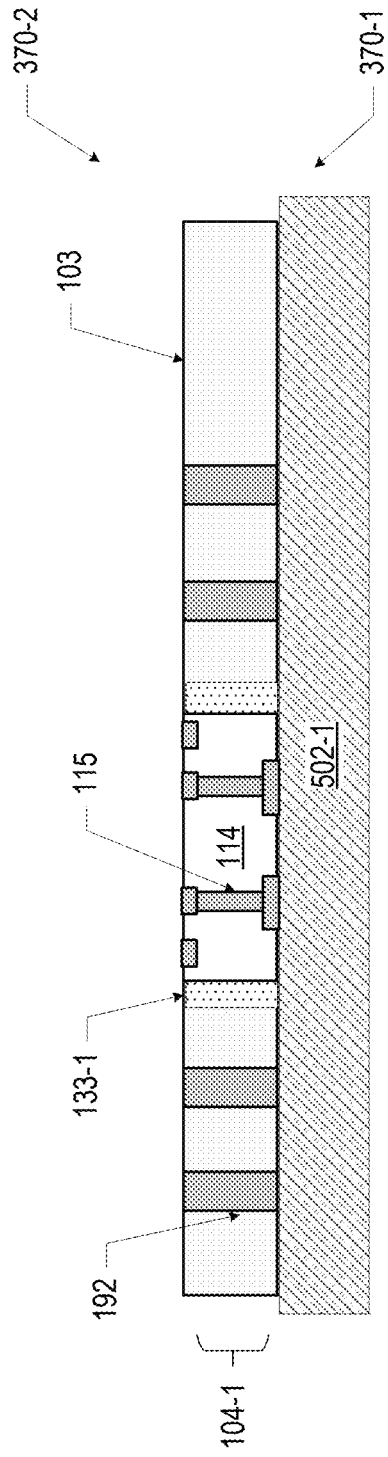

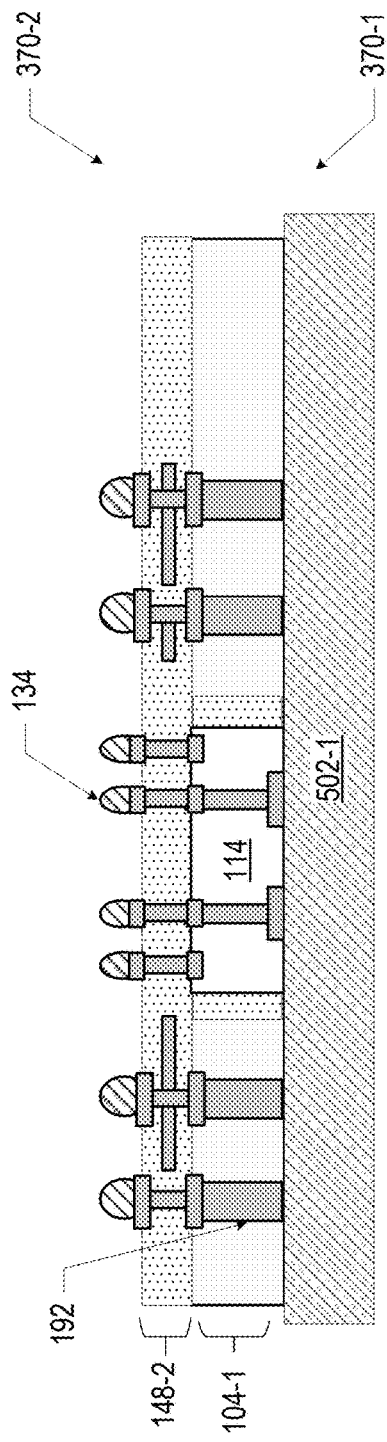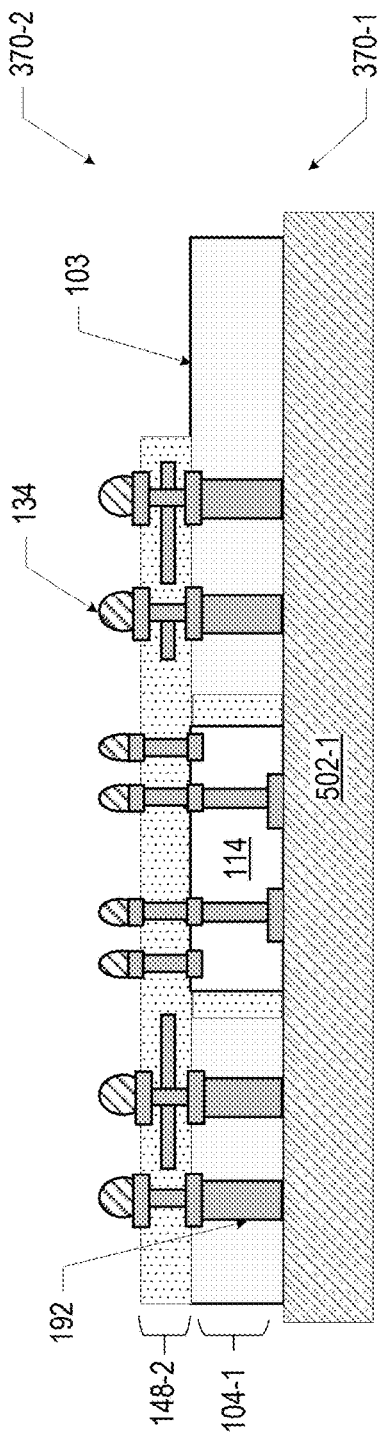

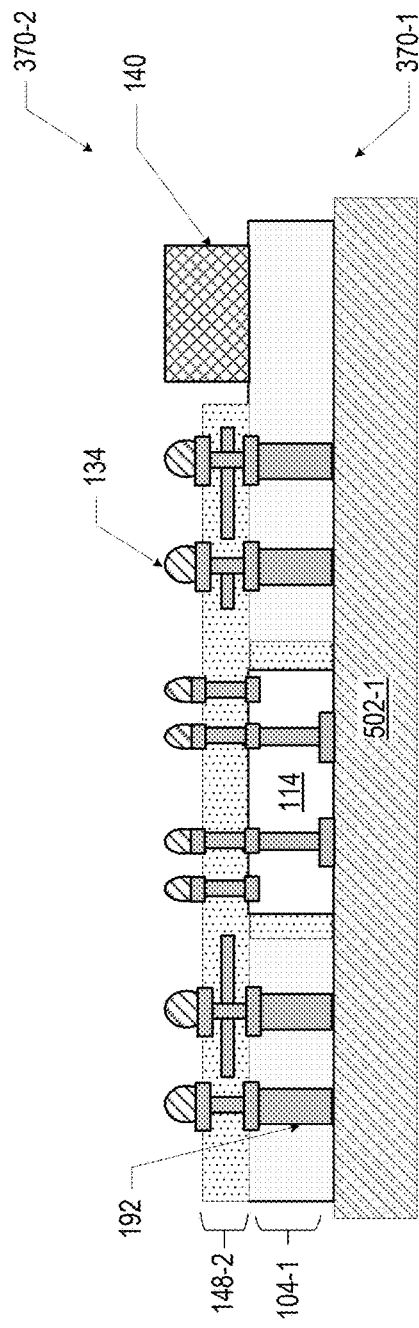
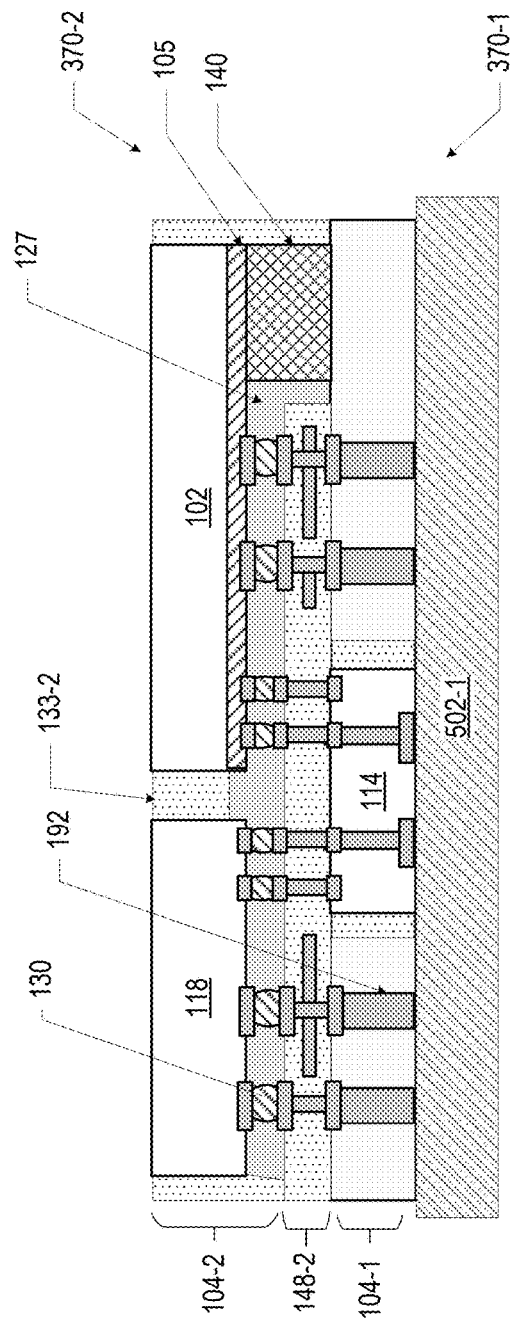
FIG. 3G
FIG. 3H

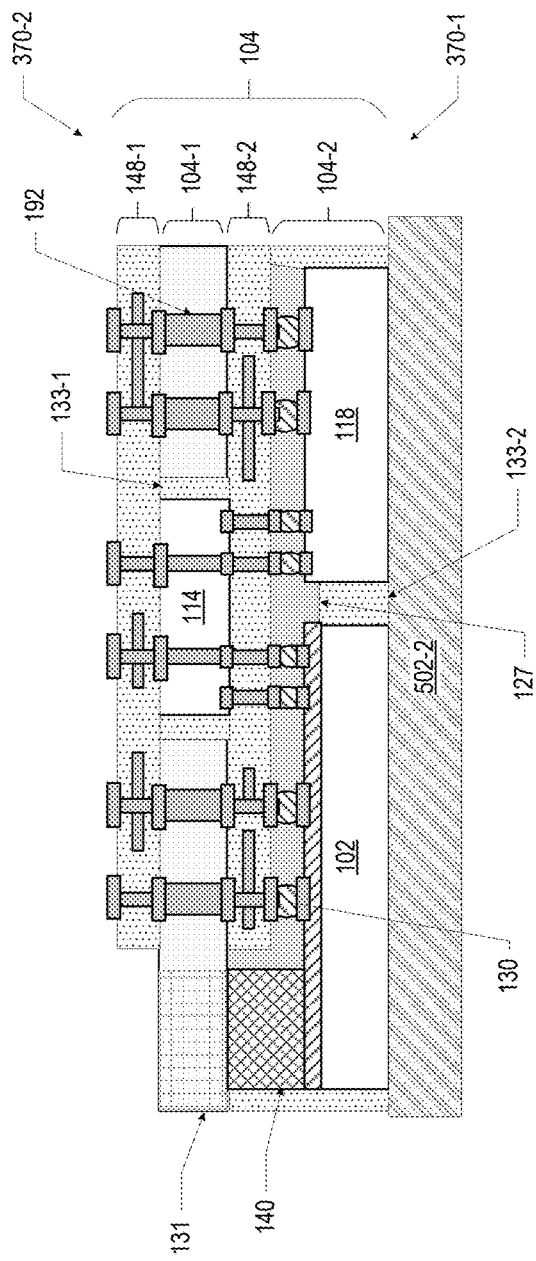
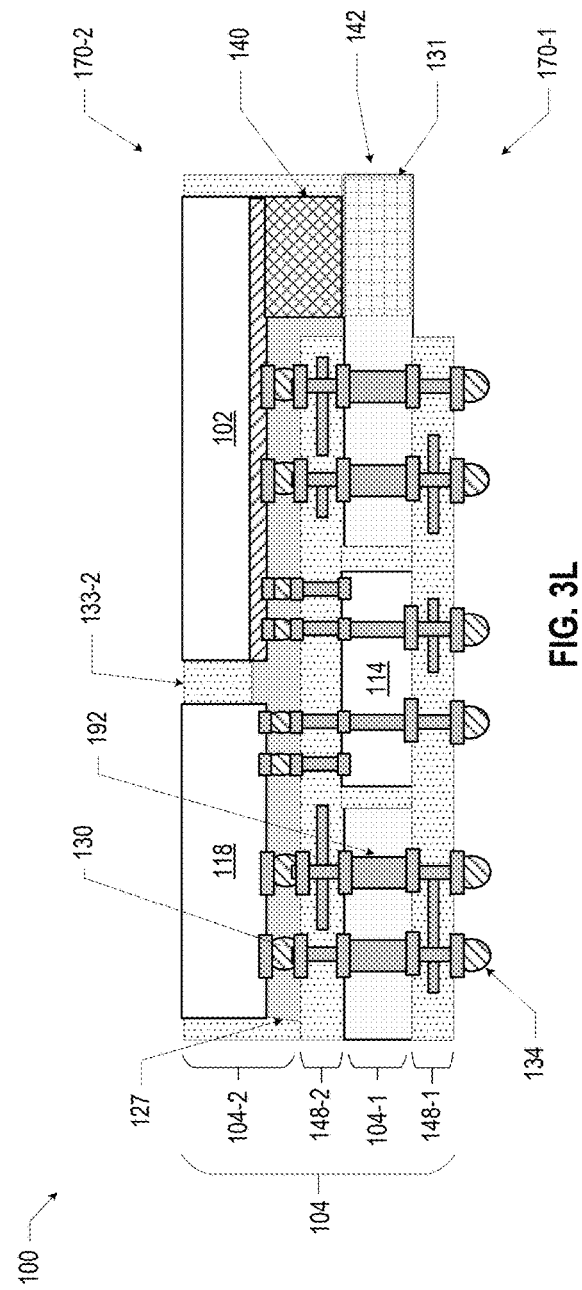
FIG. 3K
FIG. 3L

PHOTONIC INTEGRATED CIRCUIT PACKAGING ARCHITECTURES

BACKGROUND

The present disclosure relates to packaging photonic integrated circuits (PICs). More specifically, it relates to techniques, methods, and apparatus directed to PIC packaging architecture.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 3A-3L are schematic side, cross-sectional views of various stages in an example process for manufacturing a photonic package, in accordance with various embodiments.

DETAILED DESCRIPTION

Figure 1:
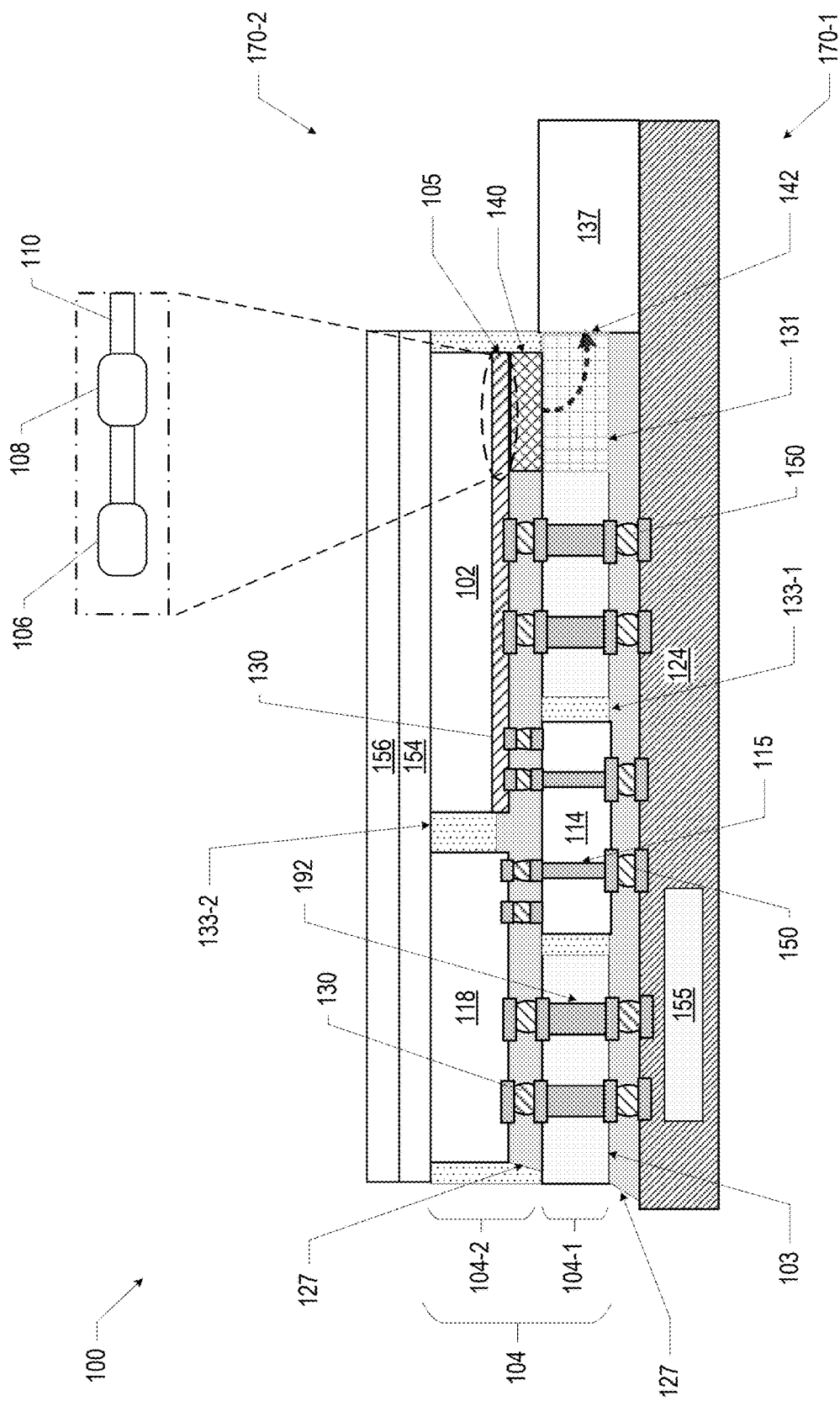
FIG. 1A is a schematic side, cross-sectional view of an example photonic packaging architecture, in accordance with various embodiments.
FIG. 1B is a schematic illustration of an example detail of an active surface of a photonic integrated circuit, in accordance with various embodiments.

Microelectronic assemblies including PICs, related devices and methods, are disclosed herein. For example, in some embodiments, a photonic microelectronic assembly may include an integrated circuit (IC) in a first layer, wherein the first layer includes a substrate having a first surface, an opposing second surface, and a lateral surface substantially perpendicular to the first and second surfaces, wherein the substrate includes a waveguide between the first and second surfaces, and wherein and the IC is nested in a cavity in the substrate; a photonic integrated circuit (PIC) in a second layer, wherein the second layer is on the first layer and an active surface of the PIC faces the first layer, and wherein the IC is electrically coupled to the active side of the PIC; and an optical component optically coupled to the active surface of the PIC and optically coupled to the waveguide in the substrate at the second surface.

Contemporary optical communications and other systems often employ PICs. Smaller, faster, and less expensive optical elements can enable universal, low-cost, high-volume optical communications needed for fast and efficient communication technologies demanded by high volume internet data traffic. In optical communications, information is transmitted by way of an optical carrier whose frequency typically is in the visible or near-infrared region of the electromagnetic spectrum. A carrier with such a high frequency is sometimes referred to as an optical signal, an optical carrier, a light wave signal, or simply light. A typical optical communications network includes several optical fibers, each of which may include several channels. A channel is a specified frequency band of an electromagnetic signal and is sometimes referred to as a wavelength. Technological advances today enable implementing portions of optical communication systems at the integrated circuit (IC) (or chip or die) level in PICs. Packaging such PICs presents many challenges.

For purposes of illustrating photonic packages described herein, it is important to understand phenomena that may come into play during packaging of PICs. The following foundational information may be viewed as a basis from which the present disclosure may be properly explained. Such information is offered for purposes of explanation only and, accordingly, should not be construed in any way to limit the broad scope of the present disclosure and its potential applications.

In a general sense, a PIC integrates photonic functions for information signals imposed on electromagnetic waves, e.g., electromagnetic waves of optical wavelengths. PICs find application in fiber-optic communication, medical, security, sensing, and photonic computing systems. The PIC may implement one or more optical and electro-optical devices such as lasers, photodetectors, waveguides, and modulators on a single semiconductor chip. In addition, the PIC may also include electrical circuitry to process electrical signals corresponding to these optical signals. Such integrated PICs can enable a cost-effective solution for optical communication and optical interconnects.

Packaging the PIC is not trivial. Among the challenges is a need for parallel tight-pitch interconnects that enable high density, high bandwidth electrical communication between the PIC and other electrical devices, such as processing units (XPU) and electronic integrated circuits (EIC) with simultaneous optical access to the PIC for the optical signals. Indeed, getting optical signals into and out of PICs is a driver of manufacturing cost and complexity. In addition, coupling a fiber-optic cable, also sometimes referred to as "optical fiber" or, simply, a "fiber," to a PIC so that electromagnetic signals, e.g., optical signals, may exchange between the two is challenging. One way to couple a PIC to a fiber is to implement edge-coupling by using an intermediate optical coupling structure (OCS) (sometimes referred to as "fiber assembly unit" (FAU) or "fiber array block") that has one end coupled to a fiber and an opposite end placed proximate to a PIC die (i.e., a die that houses one or more PICs) so that electromagnetic signals may be exchanged between the PICS of the PIC die and the fiber, via the OCS.

However, because the signals require a transparent medium for propagation, the PIC must be typically exposed in the package to allow the fiber to be coupled to the PIC with sufficient stability even in such edge-coupled assemblies. For example, in some packaging architectures, the PIC has an overhang to couple to the fiber which presents at the edge of the package. In another example, the PIC is located in a cavity so that it is exposed, and the fiber, which presents at the package edge, is coupled to the exposed face. Both these architectures cannot support small footprint PICs because a substantial area of the PIC having functional structures and circuitry is used up in coupling to the fiber. They are also limited in the density of their electrical interconnects to other ICs in the package.

In one aspect of the present disclosure, an example of a photonic packaging architecture includes a photonic package that comprises a package substrate, an IC, an insulating material, a PIC having an active side and a lateral side substantially perpendicular to the active side, and an optical lens coupled to the PIC on the lateral side. The PIC includes at least one optical element on the active side. A substantial portion of the active side of the PIC is in contact with the insulating material, and the PIC is electrically coupled to the package substrate and to the IC.

As used herein, the term "optical element" includes arrangements of forms fabricated in ICs to receive, transform and/or transmit optical signals as described herein. It may include optical conductors such as waveguides, grating coupler, electromagnetic radiation sources such as lasers, and electro-optical devices such as photodetectors. As used herein, the term "waveguide" refers to any structure that acts to guide the propagation of light from one location to another location typically through a substrate material such as silicon or glass. In various examples, waveguides can be formed from silicon, doped silicon, silicon nitride, glasses such as silica (e.g., silicon dioxide or SiO2), borosilicate (e.g., 70-80 wt % SiO2, 7-13 wt % of B2O3, 4-8 wt % Na2O or K2O, and 2-8 wt % of Al2O3) and so forth. Waveguides may be formed using various techniques including but not limited to forming waveguides in-situ. For example, in some embodiments, waveguides may be formed in situ in glass using low temperature glass-to-glass bonding or by laser direct writing. Waveguides formed in situ may have lower loss characteristics. As used herein, a "package" and an "IC package" are synonymous, as are a "die, an "IC die," and an "IC." As used herein, the term "insulating" means "electrically insulating," unless otherwise specified. Although certain elements may be referred to in the singular herein, such elements may include multiple sub-elements. For example, "an insulating material" may include one or more insulating materials. As used herein, a "conductive contact" may refer to a portion of conductive material (e.g., metal) serving as an electrical interface between different components (e.g., part of an interconnect); conductive contacts may be recessed in, flush with, or extending away from a surface of a component, and may take any suitable form (e.g., a conductive pad or socket, or portion of a conductive line or via). In a general sense, an "interconnect" refers to any element that provides a physical connection between two other elements. For example, an electrical interconnect provides electrical connectivity between two electrical components, facilitating communication of electrical signals between them; an optical interconnect provides optical connectivity between two optical components, facilitating communication of optical signals between them. As used herein, both electrical interconnects and optical interconnects are comprised in the term "interconnect." The nature of the interconnect being described is to be understood herein with reference to the signal medium associated therewith. Thus, when used with reference to an electronic device, such as an IC that operates using electrical signals, the term "interconnect" describes any element formed of an electrically conductive material for providing electrical connectivity to one or more elements associated with the IC or/and between various such elements. In such cases, the term "interconnect" may refer to both conductive traces (also sometimes referred to as "metal traces," "lines," "metal lines," "wires," "metal wires," "trenches," or "metal trenches") and conductive vias (also sometimes referred to as "vias" or "metal vias"). Sometimes, electrically conductive traces and vias may be referred to as "conductive traces" and "conductive vias", respectively, to highlight the fact that these elements include electrically conductive materials such as metals. Likewise, when used with reference to a device that operates on optical signals as well, such as a photonic IC (PIC), "interconnect" may also describe any element formed of a material that is optically conductive for providing optical connectivity to one or more elements associated with the PIC. In such cases, the term "interconnect" may refer to optical waveguides (e.g., structures that guide and confine light waves), including optical fiber, optical splitters, optical combiners, optical couplers, and optical vias.

Each of the structures, assemblies, packages, methods, devices, and systems of the present disclosure may have several innovative aspects, no single one of which is solely responsible for all the desirable attributes disclosed herein. Details of one or more implementations of the subject matter described in this specification are set forth in the description below and the accompanying drawings.

In the following detailed description, various aspects of the illustrative implementations may be described using terms commonly employed by those skilled in the art to convey the substance of their work to others skilled in the art. For example, the term "connected" means a direct connection (which may be one or more of a mechanical, electrical, and/or thermal connection) between the things that are connected, without any intermediary devices, while the term "coupled" means either a direct connection between the things that are connected, or an indirect connection through one or more passive or active intermediary devices. The term "circuit" means one or more passive and/or active components that are arranged to cooperate with one another to provide a desired function. The terms "substantially," "close," "approximately," "near," and "about," generally refer to being within +/−20% of a target value (e.g., within +/−5 or 10% of a target value) based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The terms "over," "under," "between," "at," and "on" as used herein refer to a relative position of one material layer or component with respect to other layers or components. For example, one layer disposed over or under another layer may be directly in contact with the other layer or may have one or more intervening layers. Moreover, one layer between two layers may be directly in contact with one or both of the two layers or may have one or more intervening layers. In contrast, a first layer described to be "on" a second layer refers to a layer that is in direct contact with that second layer. Similarly, unless explicitly stated otherwise, one feature between two features may be in direct contact with the adjacent features or may have one or more intervening layers.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

In the drawings, same reference numerals refer to the same or analogous elements shown so that, unless stated otherwise, explanations of an element with a given reference numeral provided in context of one of the drawings are applicable to other drawings where element with the same reference numerals may be illustrated. The drawings are not necessarily drawn to scale. Furthermore, in the drawings, some schematic illustrations of example structures of various devices and assemblies described herein may be shown with precise right angles and straight lines, but it is to be understood that such schematic illustrations may not reflect real-life process limitations which may cause the features to not look so "ideal" when any of the structures described herein are examined using, e.g., images of suitable characterization tools such as scanning electron microscopy (SEM) images, transmission electron microscope (TEM) images, or non-contact profilometer. In such images of real structures, possible processing and/or surface defects could also be visible, e.g., surface roughness, curvature or profile deviation, pit or scratches, not-perfectly straight edges of materials, tapered vias or other openings, inadvertent rounding of corners or variations in thicknesses of different material layers, occasional screw, edge, or combination dislocations within the crystalline region(s), and/or occasional dislocation defects of single atoms or clusters of atoms. There may be other defects not listed here but that are common within the field of device fabrication and/or packaging.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, the phrase "FIG. 1" may be used to refer to the collection of drawings of FIGS. 1A and 1B, the phrase "FIG. 3" may be used to refer to the collection of drawings of FIGS. 3A-3L, etc.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

FIG. 1A is a side, cross-sectional illustration of a photonic package 100, according to some embodiments of the present disclosure. The photonic package 100 may include a multi-layer die subassembly 104 having an integrated optical surface component 140 optically coupled to a PIC 102 and a waveguide 131 in a glass substrate 103. As used herein, the terms "photonic package," "photonic microelectronic assembly," and similar variations may be used interchangeably. As used herein, "optically coupled" refers to two or more optical components be aligned at the bonding interfaces to minimize optical loss across the optical path. As used herein, the term a "multi-layer die subassembly" 104 may refer to a composite die having two or more stacked layers with one or more dies in each layer, and conductive interconnects and/or conductive pathways connecting the one or more dies, including dies in non-adjacent layers. As used herein, the terms a "multi-layer die subassembly" and a "composite die" may be used interchangeably. As shown in FIG. 1A, the multi-layer die subassembly 104 may include a first layer 104-1 having a glass substrate 103 with a through-glass-substrate via (TGV) 192, a waveguide 131, and an EIC 114, and a second layer 104-2 having an XPU 118 and a PIC 102 with an optical surface component 140 optically coupled to the active side of PIC 102 at a first end and optically coupled to the waveguide 131 in the glass substrate 103 at an opposing second end. The multi-layer die subassembly 104 may include an EIC 114 and TGVs 192 in a first layer 104-1 electrically coupled via interconnects 130 to an XPU 118 and a PIC 102 in a second layer 104-2. Examples of optical surface components 140 include any suitable optical structures for propagating optical signals, such as, a glass block, a fiber array block, a fiber coupler, an optical lens, an isolator (e.g., for beam separation), a planar lens (e.g., for beam collimation), a micro-lens, a glass block with a reflector, a glass block with a curved surface, a mirror reflector, a multi-directional reflector, a waveguide, a laser written waveguide, and combinations thereof. In some embodiments, the optical surface component 140 may include an index matching polymer, an optical epoxy, a polyimide, an acrylic, or a benzocyclobutene (BCB) material (e.g., in the form of benzene and cyclobutane). In some embodiments, the optical surface component 140 may include an oxide material, such as silicon oxide (e.g., in the form of silicon and oxygen). In embodiments where the optical surface component 140 is an optical lens, the optical lens may be of any type, including lensed fiber (lens integrated with optical fiber), polymer micro lens, prism lens, graded refractive-index (GRIN) lens or any other suitable lens that can serve as an optical coupler between waveguide 110 and an optical fiber (not shown) that facilitates optical coupling to other parts of a system. In various embodiments, the optical surface component 140 may comprise an array of optical surface components. In an example embodiment, an array may comprise 12 to 24 such optical surface components. In another example, an array may be a two-dimensional (2D) array.

As shown in FIG. 1A, the multi-layer die subassembly 104 may include a first surface 170-1 and an opposing second surface 170-2. A first layer 104-1 may include a glass substrate 103 that provides mechanical stability and is optically compatible with PIC 102, optical surface component 140, and optical component 137. Although the first layer 104-1 is referred to herein as "a glass substrate," any suitable glass material having the desired mechanical and optical properties may be used. For example, a glass substrate 103 may include any suitable type of glass known in the art, including but not limited to photoglass, borosilicate glass, such as Pyrex®, soda lime glass, quartz, or other glass material. In some embodiments, the glass substrate 103 may include a photoimageable glass, such as APEX® Glass, manufactured by Life Bioscience, Inc., or other borosilicate-based glasses with oxide additions. In some embodiments, an overall thickness (e.g., a z-height) of the glass substrate 103 may be between 50 microns and 1,000 microns. The glass substrate 103 may include a bottom surface (e.g., the surface facing the first surface 170-1), an opposing top surface (e.g., the surface facing the second surface 170-2) and a lateral surface 142 substantially perpendicular to the bottom and top surfaces. The waveguide 131 in the glass substrate 103 may convert light traveling in a vertical (e.g., downward) direction from PIC 102 to travelling in a lateral (e.g., sideward) direction, as depicted by the dashed arrow. The multi-layer die subassembly 104 may further include an optical component 137 optically coupled to the waveguide 131 at a lateral surface 142 of the glass substrate 103. Examples of optical components 137 include any suitable optical structures for propagating optical signals in a desired direction, including any of the optical structures as described above with reference to optical surface component 140. The optical surface component 140 may be optically coupled to PIC 102, and the optical surface component 140 and the optical component 137 may be optically coupled to the waveguide 131, using any suitable attachment means, for example, optical glue. Optical glue may comprise any suitable material that can permit optical signals to pass through while serving to adhere the optical surface component 140 to PIC 102 and/or waveguide 131 as well as the optical component 137 to waveguide 131. The materials can include, by way of examples, and not as limitations, ultraviolet curing optical adhesives, epoxies, silicone, modified silane, and acrylates. Optical bonding surfaces of PIC 102, optical surface component 140, waveguide 131, and optical component 137 may be ground and polished to achieve suitable surface quality that enables optical interconnection with no substantial loss in optical signal integrity across boundaries of PIC 102 and optical component 137. In some embodiments, such as when the optical surface component 140 includes glass, the optical surface component 140 may be optically coupled to PIC 102 and the waveguide 131 using glass-to-glass bonding. In some embodiments, such as when the optical surface component 140 includes an index matching epoxy, no additional attachment means may be used. The optical surface component 140, the waveguide 131, and the optical component 137 may have any suitable dimensions. The optical surface component 140, the waveguide 131, and the optical component 137 may be designed (e.g., with specific dimensions of thickness, height, and/or diameter) and optically aligned to achieve a desired beam expansion target. In some embodiments, the optical surface component 140, the waveguide 131, and the optical component 137 may have a same cross-sectional size and shape (e.g., a same optical bonding surface area). In some embodiments, the optical surface component 140, the waveguide 131, and the optical component 137 may have different cross-sectional sizes and shapes. For example, a cross-sectional dimension (e.g., diameter or area) of the optical component 137 may be smaller than a cross-sectional dimension of the optical surface component 140.

As shown, photonic package 100 may include a PIC 102 having an active side 105 with optical elements. Example optical elements over a portion of active side 105 are shown in more detail in FIG. 1B. FIG. 1B is a schematic of a face of active side 105 (e.g., looking down at the active side 105 of the PIC 102). Example optical elements include an electromagnetic radiation source 106, an electro-optical device 108, and a waveguide 110 on active side 105. In many embodiments, the optical elements may be fabricated on active side 105 using any known method in the art, including semiconductor photolithographic and deposition methods. In some embodiments, the optical elements may extend substantially across an entire area of active side 105. In some embodiments, the optical elements may be confined within a portion of active side 105.

Electromagnetic radiation source 106 can enable generating optical signals and may include lasers, for example if PIC 102 supports wavelengths between about 0.8 and 1.7 micrometer; or oscillators, for example, if PIC 102 supports wavelengths on a millimeter scale; or some combination of lasers and oscillators, for example, if PIC 102 supports wavelengths between 0.8 micrometer and millimeter or centimeter. Electro-optical device 108 can enable receiving, transforming, and transmitting optical signals. In some embodiments, electro-optical device 108 may be any device or component configured to encode information in/on to the electromagnetic signals, such as modulator, polarizer, phase shifter, and photodetector.

Waveguide 110 can guide optical signals and also perform coupling, switching, splitting, multiplexing and demultiplexing optical signals. In some embodiments, waveguide 110 may include any component configured to feed, or launch, the electromagnetic signal into the medium of propagation such as an optical fiber. In some embodiments, waveguide 110 may further be configured as optical multiplexers and/or demultiplexers, for example, to perform a frequency division multiplexing (FDM) or wavelength division multiplexing (WDM). In some embodiments, waveguide 110 may include a de-multiplexer, such as Arrayed Waveguide Grating (AWG) de-multiplexer, an Echelle grating, a single-mode waveguide, or a thin film filter (TFF) de-multiplexer. Waveguide 110 may comprise planar and non-planar waveguides of any type. In one example, waveguide 110 may comprise a silicon photonic waveguide based on silicon-on-isolator (SOI) platform, configured to guide electromagnetic radiation of any wavelength bands from about 0.8 micrometer to about 5 centimeter. In another example, waveguide 110 may support wavelengths from about 1.2 micrometer to about 1.7 micrometer in the near infrared and infrared bands for use in data communications and telecommunications. In another example, waveguide 110 may support wavelengths from about 1 millimeter to about 10 millimeter extremely high frequency (EHF) band of radio/micro-waves), and in particular, wavelengths of about 2 millimeter may be used for radar and radio frequency (RF) wireless communications. In various embodiments, one or more waveguide 110 of PIC 102 may be exposed on an active surface 105 enabling optical coupling to optical component 137.

Although only three such example optical elements are illustrated in FIG. 1B, it may be understood that PIC 102 may include more optical elements of the same or different types that enable it to function appropriately as a photonic device receiving, transforming, and transmitting optical and electrical signals. For example, PIC 102 may further include optical elements, such as a grating coupler, at an active surface 105 that allow PIC 102 to transmit and/or receive light through the active surface 105 (e.g., vertical transmission and reception of light).

In some embodiments, the optical elements on active side 105 may be covered with a protective layer (not shown) of suitable material, such as optical epoxy or silicon oxide. The protective layer enables maintaining integrity of the optical elements during fabrication processes to which PIC 102 may be subjected, for example, attaching, solder reflowing, grinding, polishing, underfilling, and molding. The protective layer may ensure, for example, that optical transmission properties of the optical elements are not compromised during the fabrication processes by contamination with mold or underfill material, or that optical functionality is not compromised by tearing, breaking, or other destructive events during the fabrication processes. The protective layer may also serve to avoid leaking optical signals from the optical elements, including waveguide 110, during operation of PIC 102. For example, the protective layer may further serve to provide oxide-to-oxide bonding between the optical elements of PIC 102 and the optical component 137 when a silicon oxide material is used. In another example, the protective layer may serve to provide nitride-to-nitride bonding between the optical elements of PIC 102 and the optical component 137 when a silicon nitride material is used. The silicon oxide layers in oxide-to-oxide bonding, or the silicon nitride layers in nitride-to-nitride bonding, may be bonded initially by Van-der-Waals forces and subsequently by high temperature fusion bonding. The oxide-to-oxide bonding and nitride-to-nitride bonding may decrease optical signal losses.

In general, the light provided to PIC 102 may include any electromagnetic signals having information encoded therein (or, phrased differently, any electromagnetic signals modulated to include information). Often times, the electromagnetic signals are signals associated with optical amplitudes, phases, and wavelengths and, therefore, descriptions provided herein refer to "optical" signals (or light) and "optical" components (e.g., "electro-optical device 108"). However, photonic package 100 with PIC 102, as described herein, are not limited to operating with electromagnetic signals of optical spectrum and descriptions provided herein with reference to optical signals and/or optical elements are equally applicable to electromagnetic signals of any suitable wavelength, such as electromagnetic signals in near-infrared (NIR) and/or infrared (IR) bands, as well as electromagnetic signals in the RF and/or microwave bands.

PIC 102 may comprise a semiconductor material including, for example, N-type or P-type materials. PIC 102 may include, for example, a crystalline substrate formed using a bulk silicon (or other bulk semiconductor material) or a SOI structure (or, in general, a semiconductor-on-insulator structure). In some embodiments, PIC 102 may be formed using alternative materials, which may or may not be combined with silicon, that include, but are not limited to, lithium niobite, indium phosphide, silicon dioxide, germanium, silicon germanium, indium antimonide, lead telluride, indium arsenide, indium phosphide, gallium arsenide, aluminum gallium arsenide, aluminum arsenide, indium aluminum arsenide, aluminum indium antimonide, indium gallium arsenide, gallium nitride, indium gallium nitride, aluminum indium nitride or gallium antimonide, or other combinations of group III-N or group IV materials. In some embodiments, PIC 102 may comprise a non-crystalline material, such as polymers. In some embodiments, PIC 102 may be formed on a printed circuit board (PCB). In some embodiments, PIC 102 may be inhomogeneous, including a carrier material (such as glass or silicon carbide) as a substrate with a thin semiconductor layer over which is active side 105. Although a few examples of the material for PIC 102 are described here, any material or structure that may serve as a foundation upon which PIC 102 may be built falls within the spirit and scope of the present disclosure.

Turning back to FIG. 1A, PIC 102 may be electrically coupled by way of interconnects 130 to an EIC 114. Interconnects 130 may comprise die-to-die (DTD) interconnects along with associated conductive traces, planes, vias, and pads enabling electrical coupling between PIC 102 and EIC 114. Note that some component parts of interconnects are shown in FIG. 1A but are not labeled separately so as not to clutter the drawing. In some embodiments, interconnects 130 may comprise flip-chip interconnects that enable photonic package 100 to achieve a smaller footprint and higher die-to-package-substrate connection density than could be achieved using conventional wire-bond techniques, in which conductive contacts between PIC 102 and EIC 114 are constrained to be located on a periphery of PIC 102 and/or EIC 114. For example, PIC 102 having a square shape with side length N may be able to form 4N wire-bond interconnects, versus $N^2$ flip-chip interconnects utilizing the entire "full field" surface area of PIC 102. Implementing interconnects 130 in a high-density configuration may enable photonic package 100 to have much lower parasitic inductance relative to using wire-bonds, which may result in improved signal integrity for high-speed signals between PIC 102 and EIC 114.

In addition, by co-packaging PIC 102 with EIC 114 using interconnects 130 in a high-density configuration, input/output power can be reduced by limiting electrical signaling to intra-package distances while also reducing cost and signal loss (among other advantages). The three-dimensional (3D) stacked architecture can lower power requirements for data transfer, for example, to 2-3 picoJoules/bit. The high-density configuration can also enable serialization of electromagnetic signals in PIC 102, further allowing fewer number of electrical interconnects with EIC 114. In some example embodiments, interconnects 130 may be formed with a high-density pitch between 18 and 36 micrometer. In an example embodiment, interconnects 130 may be formed with a high-density pitch of 25 micrometer.

In some embodiments, EIC 114 may comprise an IC configured to electrically integrate with PIC 102 to achieve an intended functionality of photonic package 100. For example, EIC 114 may be an Application Specific IC (ASIC), such as a switch circuit or driver/receiver circuit used in optical communication systems. In some embodiments, EIC 114 may comprise a bridge circuit, for example, including an embedded multi-die interconnect bridge having appropriate circuitry on/in a semiconductor substrate to connect at silicon-interconnect speeds with a small footprint as part of an Omni-Directional Interface (ODI) architecture, for example, of 2.5D packages. In some embodiments, EIC 114 may comprise active components, including one or more transistors, voltage converters, trans-impedance amplifiers (TIA), clock and data recovery (CDR) components, microcontrollers, etc. In some embodiments, EIC 114 may comprise passive circuitry sufficient to enable interconnection to PIC 102 and other components in photonic package 100 without any active components. In some embodiments, EIC 114 may extend under a substantial area of PIC 102; in other embodiments, EIC 114 may overlap with PIC 102 along one or more edges. In various embodiments, EIC 114 and PIC 102 may overlap sufficiently to enable disposing interconnects 130 with a desired pitch and number of interconnections that enable photonic package 100 to function appropriately.

In various embodiments, EIC 114 and/or PIC 102 may include electrical components and circuitry that are equivalents of XPU 118 to allow suitable functionality of PIC 102 in photonic package 100. In other embodiments, PIC 102 and EIC 114 may function suitably without the need for XPU 118 or its equivalents.

Interconnects 130 may further provide electrical coupling between EIC 114 and an XPU 118. Interconnects 130 may enable electrical coupling between PIC 102, EIC 114, and XPU 118. XPU 118 may comprise any suitable integrated chip with processing functionality, such as Central Processing Unit (CPU), Graphics Processing Unit (GPU), Field-Programmable Gate Array (FPGA), ASIC, and accelerator. In various embodiments, XPU 118 may be, or include, one or more voltage converters, Trans Impedance Amplifier (TIA), Clock and Data Recovery (CDR) components, microcontrollers, etc. In some embodiments, interconnects 130 may comprise high-density flip-chip interconnects.

PIC 102 and XPU 118 in the second layer 104-2 may be coupled to the package substrate 124 by the TGVs 192 to form multi-level (ML) interconnects. In particular, PIC 102 and XPU 118 may be coupled to the package substrate 124 by the TGVs 192 and the interconnects 150. The ML interconnects may be power delivery interconnects or high speed signal interconnects. As used herein, the term "ML interconnect" may refer to an interconnect that includes a TGV 192 between a first component and a second component where the first component and the second component are not in adjacent layers (not shown), or may refer to an interconnect that spans one or more layers (e.g., an interconnect between a package substrate and a die in a second layer).

Interconnects 150 comprising die-to-package-substrate (DTPS) interconnects, ML interconnects, and associated conductive traces, planes, vias, and pads may provide electrical coupling between EIC 114 and a package substrate 124, and PIC 102 or XPU 118 and package substrate 124. In various embodiments, package substrate 124 may comprise a single or multi-layered insulating material with metallization including planes, traces, vias, and passive components (e.g., inductors, capacitors) within the insulating material and/or on the surfaces. Package substrate 124 may comprise ceramic (e.g., alumina) and/or organic material (e.g., epoxy based FR4, resin based bismaleimide triazine (BT), or polyimide) and may be formed in various varieties including rigid and tape. Package substrate 124 may provide mechanical base support and appropriate interfaces to access components in photonic package 100 electrically and optically.

Interconnects 150 may comprise any suitable interconnection, including flip-chips and ball-grid array (BGA) with corresponding metallization, pads and vias, including through-substrate-vias (TSVs) 115 through EIC 114. For example, EIC 114 may include TSVs 115 that electrically couple the package substrate 124 to the bottom surface of the EIC 114 via interconnects 150. Note that the shapes of various interconnects shown in the figure are merely for illustrative purposes and are not to be construed as limitations. The actual shapes of interconnects 130 and/or 150 for example, may result from natural processes occurring during solder reflow. The shapes may depend on material viscosity in liquid state, temperatures of processing, surface tension forces, capillary action, and other mechanisms beyond the scope of the present disclosure. Interconnects 130 and 150 may enable a stacked architecture that enables low power, low loss, high-speed electrical signals between PIC 102, EIC 114, and XPU 118. Such architecture allows for top-packaged chips (e.g., PIC 102, EIC 114 and XPU 118) to communicate with each other horizontally or vertically, permitting smaller footprint, higher speeds, and reduced power usage for photonic package 100.

The multi-layer die subassembly 104 may include an insulating material 133 (e.g., an insulating material 133-1 of the first layer 104-1 surrounding EIC 114 and an insulating material 133-2 of the second layer 104-2 surrounding PIC 102 and XPU 118). The insulating material 133 (e.g., a dielectric material formed in multiple layers, as known in the art) may be formed in multiple layers and may embed one or more dies in a layer. In some embodiments, the insulating material 133 of the multi-layer die subassembly 104 may be a dielectric material, such as an organic dielectric material, a fire retardant grade 4 material (FR-4), bismaleimide triazine (BT) resin, polyimide materials, glass reinforced epoxy matrix materials, or low-k and ultra low-k dielectric (e.g., carbon-doped dielectrics, fluorine-doped dielectrics, porous dielectrics, and organic polymeric dielectrics). In some embodiments, the dies (e.g., PIC 102, EIC 114 and XPU 118) may be embedded in an inhomogeneous dielectric, such as stacked dielectric layers (e.g., alternating layers of different inorganic dielectrics). In some embodiments, the insulating material 133 of the multi-layer die subassembly 104 may be a mold material, such as an organic polymer with inorganic silica particles. In some embodiments, the insulating materials 133-1, 133-2 (e.g., first and second layers 104-1, 104-2 of the multi-layer die subassembly 104) may include a same insulating material. In some embodiments, the insulating materials 133-1, 133-2 (e.g., the first and second layers 104-1, 104-2 of the multi-layer die subassembly 104) may include different insulating materials. The multi-layer die subassembly 104 may have any suitable dimensions. For example, in some embodiments, a thickness of the multi-layer die subassembly 104 may be between 100 µm and 2000 µm. In some embodiments, the multi-layer die subassembly 104 may be a composite die, such as stacked dies. The multi-layer die subassembly 104 may have any suitable number of layers, any suitable number of dies, and any suitable die arrangement. For example, in some embodiments, the multi-layer die subassembly 104 may have between 3 and 20 layers of dies. In some embodiments, the multi-layer die subassembly 104 may include a layer having between 2 and 50 dies.

The photonic package 100 of FIG. 1A may also include an underfill material 127. In some embodiments, the underfill material 127 may extend between the multi-layer die subassembly 104 and the package substrate 124 around the associated interconnects 150. In some embodiments, the underfill material 127 may extend between the first layer 104-1 and the second layer 104-2 and around the associated interconnects 130 (e.g., between EIC 114 and XPU 118, and between EIC 114 and PIC 102). In some embodiments, the underfill material 127 around the interconnects 130 is a same material as the underfill material 127 around the interconnects 150. In some embodiments, the underfill material 127 around the interconnects 130 is a different material than the underfill material 127 around the interconnects 150. The underfill material 127 may comprise any suitable material that can perform underfill functions, such as supporting the dies and reducing thermal stress on interconnects. The underfill material 127 may be an insulating material, such as an appropriate epoxy material. In some embodiments, the underfill material 127 may include a capillary underfill, non-conductive film (NCF), or molded underfill. In some embodiments, the underfill material 127 may include an epoxy flux that assists with soldering EIC 114 in the first layer 104-1 to PIC 102 and/or XPU 118 in the second layer 104-2 when forming the interconnects 130, and then polymerizes and encapsulates the interconnects 130. In some embodiments, the underfill material 127 may include an epoxy flux that assists with soldering multi-layer die subassembly 104 to the package substrate 124 when forming the interconnects 150, and then polymerizes and encapsulates the interconnects 150. The underfill material 127 may be selected to have a coefficient of thermal expansion (CTE) that may mitigate or minimize the stress within the multi-layer die subassembly 104 and/or between the multi-layer die subassembly 104 and the package substrate 124 arising from uneven thermal expansion in the photonic package 100. In some embodiments, the CTE of the underfill material 127 may have a value that is intermediate to the CTE of the package substrate 124 (e.g., the CTE of the dielectric material of the package substrate 124) and a CTE of the multi-layer die subassembly 104.

Although not specifically shown in all of the present illustrations in order to not clutter the drawings, when DTD or DTPS interconnects are described, a surface of a first IC (including PICs) may include a first set of conductive contacts, and a surface of a second IC (including PICs) or a package substrate may include a second set of conductive contacts. One or more conductive contacts of the first set may then be electrically and mechanically coupled to some of the conductive contacts of the second set by the DTD or DTPS interconnects. In some embodiments, the pitch of the DTD interconnects may be different from the pitch of the DTPS interconnects, although, in other embodiments, these pitches may be substantially the same. In some embodiments, the DTPS interconnects disclosed herein may have a pitch between about 80 micrometer and 300 micrometer, while the DTD interconnects disclosed herein may have a pitch between about 7 micrometer and 100 micrometer. In an example embodiment, some DTD interconnects have a pitch of 25 micrometer. In some embodiments, the conductive contacts may be formed of aluminum, and may include a layer of gold (e.g., with a thickness of less than 1 micrometer) between the aluminum and adjacent interconnects to limit surface oxidation of the contacts and improve adhesion with adjacent contacts. Alternate materials for the surface finish include palladium, platinum, silver, copper, and tin. In some embodiments, the conductive contacts may be formed of aluminum, and may include a layer of a barrier metal such as nickel, as well as a layer of gold, or other appropriate material, wherein the layer of barrier metal is disposed between aluminum and gold, and the layer of gold is disposed between the barrier metal and the adjacent interconnect. In such embodiments, the gold, or other surface finish, may protect the barrier metal surface from oxidation before assembly, and the barrier metal may limit diffusion of solder from the adjacent interconnects into aluminum. In some embodiments, surfaces of PIC 102, EIC 114, and XPU 118 in contact with solder may be covered by a suitable solder mask material (not shown) that prevents solder from melting and bridging adjacent contacts during solder reflow.

The DTPS interconnects disclosed herein may take any suitable form. In some embodiments, a set of DTPS interconnects may include solder (e.g., solder bumps or balls that are subject to a thermal reflow to form the DTPS interconnects). DTPS interconnects that include solder may include any appropriate solder material, such as lead/tin, tin/bismuth, eutectic tin/silver, ternary tin/silver/copper, eutectic tin/copper, tin/nickel/copper, tin/bismuth/copper, tin/indium/copper, tin/zinc/indium/bismuth, or other alloys. In some embodiments, a set of DTPS interconnects may include an anisotropic conductive material, such as an anisotropic conductive film or an anisotropic conductive paste. An anisotropic conductive material may include conductive materials dispersed in a non-conductive material. In some embodiments, an anisotropic conductive material may include microscopic conductive particles embedded in a binder or a thermoset adhesive film (e.g., a thermoset biphenyl-type epoxy resin, or an acrylic-based material). In some embodiments, the conductive particles may include a polymer and/or one or more metals (e.g., nickel or gold). For example, the conductive particles may include nickel-coated gold or silver-coated copper that is in turn coated with a polymer. In another example, the conductive particles may include nickel. When an anisotropic conductive material is uncompressed, there may be no conductive pathway from one side of the material to the other. However, when the anisotropic conductive material is adequately compressed (e.g., by conductive contacts on either side of the anisotropic conductive material), the conductive materials near the region of compression may contact each other so as to form a conductive pathway from one side of the film to the other in the region of compression.

The DTD interconnects disclosed herein may take any suitable form. In some embodiments, some or all of the DTD interconnects as described herein may be metal-to-metal interconnects (e.g., copper-to-copper interconnects, or plated interconnects). In such embodiments, the conductive contacts on either side of the DTD interconnect may be bonded together (e.g., under elevated pressure and/or temperature) without the use of intervening solder or an anisotropic conductive material. In some embodiments, a thin cap of solder may be used in a metal-to-metal interconnect to accommodate planarity, and this solder may become an intermetallic compound during processing. In some metal-to-metal interconnects that utilize hybrid bonding, a dielectric material (e.g., silicon oxide, silicon nitride, silicon carbide, or an organic layer) may be present between the metals bonded together (e.g., between copper pads or posts that provide the associated conductive contacts). In some embodiments, one side of a DTD interconnect may include a metal pillar (e.g., a copper pillar), and the other side of the DTD interconnect may include a metal contact (e.g., a copper contact) recessed in a dielectric. In some embodiments, a metal-to-metal interconnect (e.g., a copper-to-copper interconnect) may include a noble metal (e.g., gold) or a metal whose oxides are conductive (e.g., silver). In some embodiments, a metal-to-metal interconnect may include metal nanostructures (e.g., nanorods) that may have a reduced melting point. Metal-to-metal interconnects may be capable of reliably conducting a higher current than other types of interconnects; for example, some solder interconnects may form brittle intermetallic compounds when current flows, and the maximum current provided through such interconnects may be constrained to mitigate mechanical failure.

In some embodiments, the ICs on either side of a set of DTD interconnects may be unpackaged dies, and/or the DTD interconnects may include small conductive bumps or pillars (e.g., copper bumps or pillars) attached to the respective conductive contacts by solder. In some embodiments, some or all of the DTD interconnects may be solder interconnects that include a solder with a higher melting point than a solder included in some or all of the DTPS interconnects. For example, when the DTD interconnects are formed before the DTPS interconnects are formed, solder-based DTD interconnects may use a higher-temperature solder (e.g., with a melting point above 200 degrees Celsius), while the DTPS interconnects may use a lower-temperature solder (e.g., with a melting point below 200 degrees Celsius). In some embodiments, a higher-temperature solder may include tin; tin and gold; or tin, silver, and copper (e.g., 96.5% tin, 3% silver, and 0.5% copper). In some embodiments, a lower-temperature solder may include tin and bismuth (e.g., eutectic tin bismuth) or tin, silver, and bismuth. In some embodiments, a lower-temperature solder may include indium, indium and tin, or gallium.

In some embodiments, a set of DTD interconnects may include solder. DTD interconnects that include solder may include any appropriate solder material, such as any of the materials discussed above for the DTPS interconnects. In some embodiments, a set of DTD interconnects may include an anisotropic conductive material, such as any of the materials discussed above for the DTPS interconnects. In some embodiments, the DTD interconnects may be used as data transfer lanes, while the DTPS interconnects may be used for power and ground lines, among others.

In photonic packages as described herein, some or all of the DTD interconnects may have a finer pitch than the DTPS interconnects. In some embodiments, the DTD interconnects may have too fine a pitch to couple to the package substrate directly (e.g., too fine to serve as DTPS interconnects). The DTD interconnects may have a smaller pitch than the DTPS interconnects due to the greater similarity of materials in the different dies on either side of a set of DTD interconnects than between a die (or PIC) and a package substrate on either side of a set of DTPS interconnects. In particular, the differences in the material composition of ICs and package substrates may result in differential expansion and contraction of the ICs and package substrates due to heat generated during operation (as well as the heat applied during various manufacturing operations). To mitigate damage caused by this differential expansion and contraction (e.g., cracking, solder bridging, etc.), the DTPS interconnects in any of the photonic packages as described herein may be formed larger and farther apart than DTD interconnects, which may experience less thermal stress due to the greater material similarity of the pair of dies on either side of the DTD interconnects.

In some embodiments, conductive metallization lines and optical elements may extend into and out of the plane of the drawing, providing conductive pathways to route electrical and/or optical signals to and/or from various elements in photonic package 100. The conductive vias and/or lines that provide conductive pathways in/on the photonic package 100 may be formed using any suitable techniques. Examples of such techniques may include subtractive fabrication techniques, additive or semi-additive fabrication techniques, single Damascene fabrication techniques, dual Damascene fabrication techniques, or any other suitable techniques. In some embodiments, layers of insulator material, such as a silicon oxide material or a silicon nitride material, may insulate various structures in the conductive pathways from proximate structures, and/or may serve as etch stops during fabrication. In some embodiments, additional layers, such as diffusion barrier layers or/and adhesion layers may be disposed between conductive material and proximate insulating material. Diffusion barrier layers may reduce diffusion of the conductive material into the insulating material. Adhesion layers may improve mechanical adhesion between the conductive material and the insulating material.

The photonic microelectronic assembly 100 of FIG. 1A may also include a TIM 154. The TIM 154 may include a thermally conductive material (e.g., metal particles) in a polymer or other binder. The TIM 154 may be a thermal interface material paste or a thermally conductive epoxy (which may be a fluid when applied and may harden upon curing, as known in the art). The TIM 154 may provide a path for heat generated by the dies (e.g., one or more of EIC 114, XPU 118, and PIC 102) to readily flow to the heat transfer structure 156, where it may be spread and/or dissipated. Some embodiments of the photonic microelectronic assembly 100 of FIG. 1A may include a sputtered metallization (not shown) across the top surface of the insulating material 133-2, XPU 118, and PIC 102; the TIM 154 (e.g., a solder TIM) may be disposed on this metallization.

The photonic microelectronic assembly 100 of FIG. 1A may also include a heat transfer structure 156 on the top surface 170-2 of the multi-layer die subassembly 104 (e.g., on the top surface of XPU 118 and PIC 102). The heat transfer structure 156 may be used to move heat away from one or more of the dies (e.g., one or more of EIC 114, XPU 118, and PIC 102), so that the heat may be more readily dissipated. The heat transfer structure 156 may include any suitable thermally conductive material (e.g., metal, appropriate ceramics, etc.), and may include any suitable features (e.g., a heat spreader, a heat sink including fins, a cold plate, etc.). In some embodiments, a heat transfer structure 156 may be or may include an integrated heat spreader (IHS).

The photonic microelectronic assembly 100 of FIG. 1A may also include a heat transfer structure 155 in the package substrate 124. The heat transfer structure 155 may be used to move heat away from one or more of the dies (e.g., one or more of EIC 114, XPU 118, and PIC 102), so that the heat may be more readily dissipated. The heat transfer structure 155 may include any suitable thermally conductive material (e.g., metal, appropriate ceramics, etc.), and may include any suitable features. In some embodiments, a heat transfer structure 155 may be or may include an integrated heat spreader (IHS).

Many of the elements of the photonic package 100 of FIG. 1A are included in other ones of the accompanying drawings; the discussion of these elements is not repeated when discussing these drawings, and any of these elements may take any of the forms disclosed herein. Further, a number of elements are illustrated in FIG. 1A as included in the photonic microelectronic assembly 100, but a number of these elements may not be present in a photonic microelectronic assembly 100. For example, in various embodiments, the XPU 118, the TIM 154, the heat transfer structure 156, the heat transfer structure 155, the underfill material 127, and the package substrate 124 may not be included.

Figure 2:
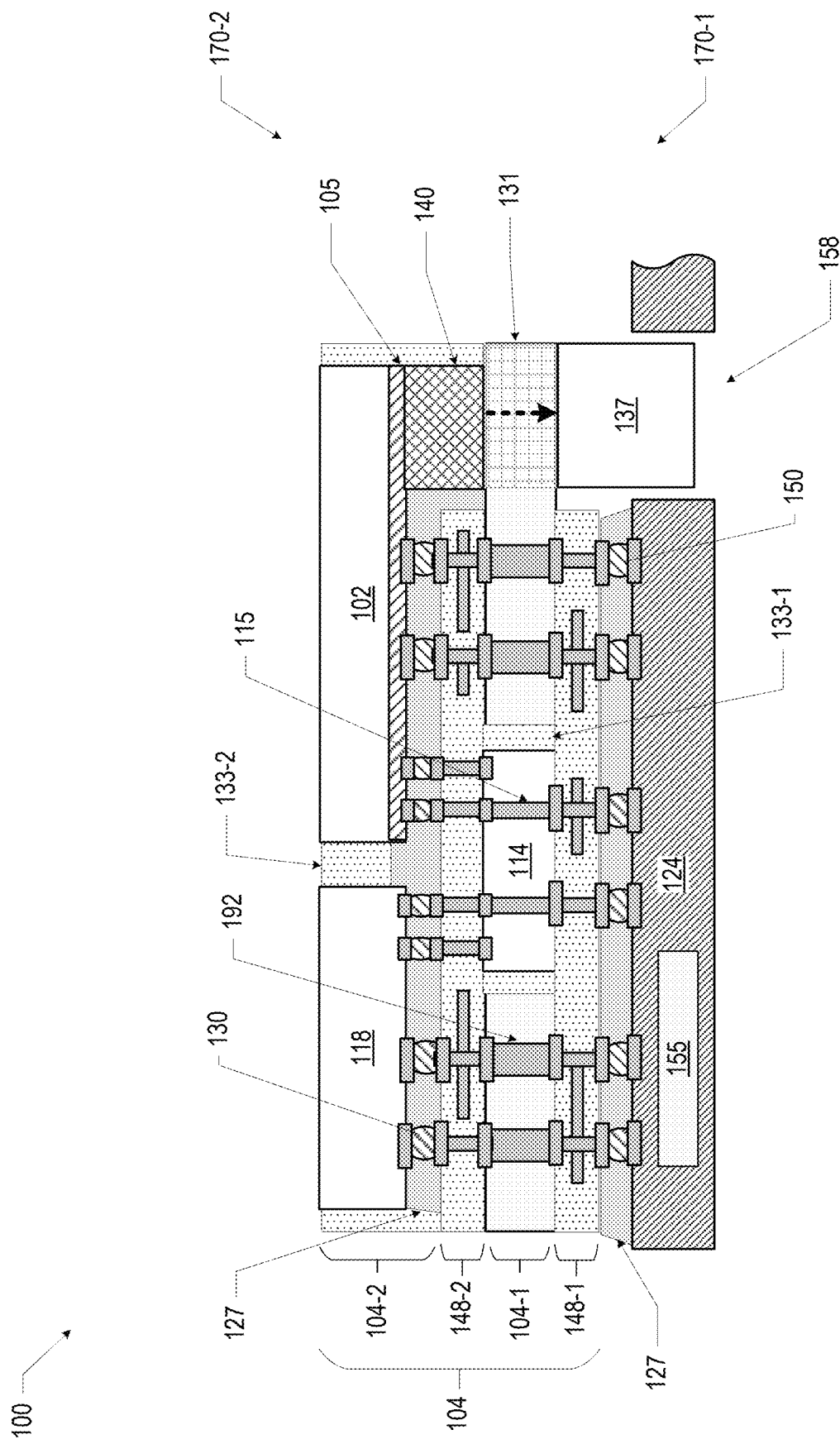
FIG. 2 is a schematic side, cross-sectional view of an example photonic packaging architecture, in accordance with various embodiments.
Figure 4:
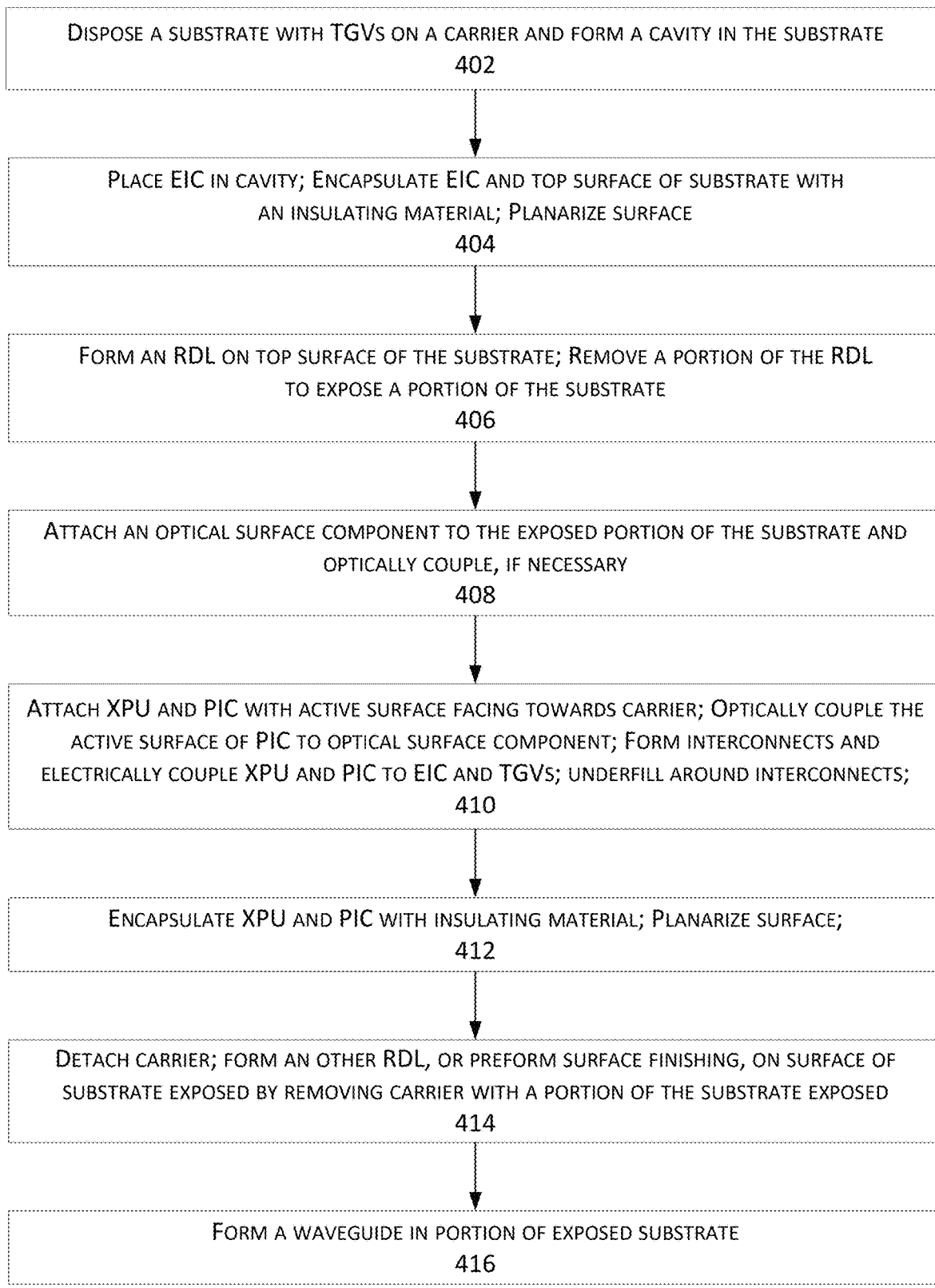
FIG. 4 is a flow diagram of an example method of fabricating a photonic package, according to various embodiments of the present disclosure.

FIG. 2 is a side, cross-sectional illustration of a photonic package 100, according to some embodiments of the present disclosure. A photonic package 100 may include a multi-layer die subassembly 104 having an integrated optical surface component 140 optically coupled to a PIC 102. A photonic package 100 may further include a redistribution layer (RDL) 148 comprising at least one layer of an insulating material and metallization (e.g., conductive pathways through a dielectric material). An RDL 148-1 may be below the first layer 104-1 (e.g., at the first surface 170-1 (e.g., RDL 148-1) and/or an RDL 148-2 may be between the first layer 104-1 and the second layer 104-2. As shown in FIG. 4, the multi-layer die subassembly 104 may include a first RDL 148-1, a first layer 104-1 on the first RDL 148-1, a second RDL 148-2 on the first layer 104-1, and a second layer 104-2 on the second RDL 148-2. In particular, a photonic package 100 may have the first RDL 148-1, the first layer 104-1 including a glass substrate 103 with an EIC 114 nested therein, TGVs 192, and a waveguide 131, a second RDL 148-2, and a second layer 104-2 having an XPU 118 and a PIC 102 with an optical surface component 140 optically coupled to the active side 105 of PIC 102 ((e.g., active surface 105 of PIC 102 facing towards the first surface 170-1) and optically coupled to the waveguide 131 in the glass substrate. An RDL 148 may enable any desired placement of solder balls with respect to vias and other circuitry of the dies (e.g., PIC 102, EIC 114, and XPU 118). In a general sense, interconnect structures may be arranged within photonic package 100 to route electrical signals according to a wide variety of designs. During operation of photonic package 100, electrical signals (such as power, input/output (I/O) signals, including various control signals for external and internal control of PIC 102) may be routed to and/or from PIC 102 through the conductive contacts and conductive pathways of photonic package 100. In particular, the multi-layer die subassembly 104 may include a PIC 102 and an XPU 118 in a second layer 104-2 electrically coupled via interconnects 130 to an EIC 114 and TGVs 192 in a first layer 104-1. The waveguide 131 in the glass substrate 103 may maintain light traveling in a vertical (e.g., downward) direction from PIC 102, as depicted by the dashed arrow. The multi-layer die subassembly 104 may further include an optical component 137 optically coupled to the waveguide 131 at the bottom surface of the glass substrate 103 (e.g., the surface of the glass substrate 103 facing the first surface 170-1). The photonic package 100 may further include a package substrate 124 having an aperture 158 (e.g., a through-hole) for propagating optical signals through the package substrate 124. In some embodiments, the optical component 137 may be placed within the aperture 158 (e.g., placed to extend, fully or partially, through the aperture 158). In some embodiments, the optical component 137 may be placed proximate to and aligned with the aperture 158 (e.g., placed to not extend through the aperture 158) (not shown), so that optical signals may be exchanged through the package substrate 124. In some embodiments, an underfill material 127 may be included around the interconnects 150. In such embodiments, mechanical and/or chemical barriers (not shown) may be included to prevent the underfill material 127 from contaminating optical component 137.

Any suitable techniques may be used to manufacture the photonic packages 100 disclosed herein. For example, FIGS. 3A-3L are side, cross-sectional views of various stages in an example process for manufacturing the photonic package 100 of FIG. 2, in accordance with various embodiments. Although the operations discussed below with reference to FIGS. 3A-3L (and others of the accompanying drawings representing manufacturing processes) are illustrated in a particular order, these operations may be performed in any suitable order. Further, additional operations which are not illustrated may also be performed without departing from the scope of the present disclosure. Also, various ones of the operations discussed herein with respect to FIGS. 3A-3L may be modified in accordance with the present disclosure to fabricate others of photonic package 100 disclosed herein.

FIG. 3A illustrates an assembly comprising a first carrier 502-1 with a glass substrate 103 having TGVs 192 and a cavity 107. The assembly may include a bottom surface 370-1 and a top surface 370-2. The assembly of FIG. 3A may be formed separately by forming via openings in a glass substrate 103, providing a conducive material, such as copper, in the via openings to form the TGVS 192, placing the glass substrate 103 with TGVs 192 on the first carrier 502-1 and forming a cavity 107. A carrier 502 may include any suitable material for providing mechanical stability during manufacturing operations. A glass substrate 103 may include any suitable type of glass, as described above with reference to FIG. 1A. The TGVs 192 may be formed to have any suitable dimensions based on the desired size and shape of the TGVs 192, including, for example, straight walls, slanted walls, a circular cross-section, or a rectangular cross-section. In some embodiments, the TGVs 192 may have a cross-section dimension between 50 microns and 350 microns. In some embodiments, the TGVs 192 may have a cross-section dimension between 50 microns and 125 microns. The cavity 107 may be formed to have any suitable dimensions based on the size and shape of the nested EIC 114, as shown in FIG. 3B. For example, the cavity 107 may be formed to have straight walls or slanted walls, and a rectangular cross-section. The cavity 107 may be formed using any suitable process, such as crack-free laser drilling. Laser drilling techniques generally form openings having a conical profile where the opening is larger towards the drilling side. Other examples of suitable processes include a laser ablation process, a mediablasting or sandblasting process, an ultrasonic drilling process, or an etching process (such as a chemical wet etching process or a dry reactive ion etching process), or a combination of these processes. In some embodiments, the cavity 107 may be formed by exposing a photoimageable glass to ultraviolet (UV) light. For example, a mask material may be used to define the area of the photoimageable glass that is exposed to ultraviolet light. The masked photoimageable glass may be exposed to ultraviolet light and heated to an elevated temperature causing a change of the structural and/or chemical properties of the area exposed to ultraviolet light, such that the exposed area may have a higher etch rate than the unexposed area of the photoimageable glass. The cavity 107 may be etched in the exposed area of the photoimageable glass using an acid, such as sodium hydroxide, hydrofluoric acid (HF), ethylenediamine pyrocatechol, potassium hydroxide/isopropyl alcohol, or tetramethylammonium hydroxide.

FIG. 3B illustrates an assembly subsequent to placing EIC 114 in the cavity 107. Any suitable method may be used to place EIC 114, for example, automated pick-and-place. As shown in FIG. 3B, EIC 114 may include TSVs 115.

FIG. 3C illustrates an assembly subsequent to depositing an insulating material 133-1 around, on, and over the EIC 114 in the cavity 107 and on a top surface 370-2 of the glass substrate 103. The insulating material 133-1 may be a mold material, such as an organic polymer with inorganic silica particles, or an epoxy material. In some embodiments, the insulating material 133-1 is a dielectric material. In some embodiments, the dielectric material may include an organic dielectric material, a fire retardant grade 4 material (FR-4), BT resin, polyimide materials, glass reinforced epoxy matrix materials, or low-k and ultra low-k dielectric (e.g., carbon-doped dielectrics, fluorine-doped dielectrics, porous dielectrics, and organic polymeric dielectrics). The insulating material 133-1 may be formed using any suitable process, including lamination, or slit coating and curing. In some embodiments, the insulating material 133-1 may be dispensed in liquid form to flow around and conform to various shapes of components and metallization, and, subsequently, may be subjected to a process, for example, curing, that solidifies the insulating material 133-1.

FIG. 3D illustrates an assembly subsequent to removing the insulating material 133-1 from the top surface 370-2 of the glass substrate 103 to expose the top surfaces of the TGVs 192 and the conductive contacts on EIC 114 to form the first layer 104-1. The insulating material 133 may be removed using any suitable technique, including grinding, or etching, such as a wet etch, a dry etch (e.g., a plasma etch), a wet blast, or a laser ablation (e.g., using excimer laser). In some embodiments, the thickness of the insulating material 133-1 may be minimized to reduce the etching time required. In some embodiments, the top surface of the insulating material 133-1 may be planarized using any suitable process, such as chemical mechanical polishing (CMP).

FIG. 3E illustrates an assembly subsequent to forming an RDL 148 (e.g., a second RDL 148-2 of FIG. 2) with conductive contacts on a top surface 370-2 of the assembly of FIG. 3D and depositing solder 134 on the conductive contacts. The RDL 148-2 may be manufactured using any suitable technique, such as a PCB technique or an SAP technique. In some embodiments, the RDL 148-2 may be omitted. In some embodiments, the solder 134 may be deposited in a subsequent process step, for example, as described below with reference to FIG. 3F.

FIG. 3F illustrates an assembly subsequent to removing a portion of the RDL 148-2 from a top surface 370-2 to expose a portion of the glass substrate 103. The RDL 148-2 may be removed using any suitable technique, such as by laser drilling, by pre-filling with a sacrificial material, or by other suitable techniques, including grinding, or etching, such as a wet etch, a dry etch (e.g., a plasma etch), a wet blast, or a laser ablation (e.g., using excimer laser) through a hard or soft mask. In some embodiments, the solder 134 may be deposited, as described above with reference to FIG. 3E, subsequent to exposing the portion of the glass substrate 103. In some embodiments, a top surface of the glass substrate 103 (e.g., the exposed portion of the glass substrate 103 facing the top surface 370-2 of the assembly) may be subjected to grinding and polishing to form an optically smooth surface subsequent to removing the RDL 148-2.

FIG. 3G illustrates an assembly subsequent to coupling an optical surface component 140 to a top surface of the exposed portion of the glass substrate 103 of the assembly of FIG. 3F. The optical surface component 140 may be optically aligned, if necessary, and optically coupled using any suitable technique, such as optical glue or oxide-to-oxide bonding. The optical surface component 140 may include any suitable material, as described above with reference to FIG. 1A. In some embodiments, the optical surface component 140 may be an index matching polymer or epoxy that is printed on the exposed portion of the glass substrate 103 (e.g., paste printing through a stencil). In some embodiments, a top surface of the optical surface component 140 (e.g., the surface facing the second surface 370-2 of the assembly) may be subjected to grinding and polishing to form an optically smooth surface.

FIG. 3H illustrates an assembly subsequent to placing and coupling PIC 102 and XPU 118, forming interconnects 130, and providing an insulating material 133-2 around PIC 102, XPU 118, and optical surface component 140 to form the second layer 104-2. PIC 102 may be placed with the active side 105 facing the first carrier 502-1. Optical elements at the active surface 105 of PIC 102 may be optically aligned, if necessary, and optically coupled to optical surface component 140 using any suitable technique, such as optical glue or oxide-to-oxide bonding. In some embodiments, optical elements at active side 105 of PIC 102 may be covered by a protective coating (not shown) for various reasons, for example, to prevent any breakage or contamination during the fabrication process, to facilitate optical coupling, or to prevent leakage of optical signals during operation, among others. In some embodiments, optical surface component 140 may be placed on and optically coupled to the active surface 105 of PIC 102 prior to placing and coupling PIC 102. EIC 114 may be electrically coupled to PIC 102 and XPU 118 by interconnects 130 and associated conductive traces, planes, and pads in the RDL 148-2. PIC 102 and XPU 118 may be electrically coupled with TGVs 192 through associated conductive traces, planes, and pads in RDL 148-2. In some embodiments, interconnects 130 may include solder. In such embodiments, the assembly of FIG. 3H may be subjected to a solder reflow process during which solder components of interconnects 130 melt and bond to mechanically and electrically couple PIC 102 and XPU 118 to the top surface 370-2 of the assembly of FIG. 3G. In some embodiments, underfill 127 may be dispensed around the interconnects 130 and between the RDL 148-2 and the optical surface component 140. In some embodiments, underfill 127 around interconnects 130 and between the RDL 148-2 and the optical surface component 140 may be omitted. The insulating material 133-2 may be a mold material, such as an organic polymer with inorganic silica particles, or an epoxy material. In some embodiments, the insulating material 133-2 is a dielectric material. In some embodiments, the dielectric material 133-2 may include an organic dielectric material, a fire retardant grade 4 material (FR-4), BT resin, polyimide materials, glass reinforced epoxy matrix materials, or low-k and ultra low-k dielectric (e.g., carbon-doped dielectrics, fluorine-doped dielectrics, porous dielectrics, and organic polymeric dielectrics). The insulating material 133-2 may be formed using any suitable process, including lamination, or slit coating and curing. In some embodiments, the insulating material 133-2 may be dispensed in liquid form to flow around and conform to various shapes of components and metallization, and, subsequently, may be subjected to a process, for example, curing, that solidifies the insulating material 133-2. In some embodiments, the insulating material 133-2 may be initially deposited on and over the top surfaces of PIC 102 and XPU 118, then polished back to expose the top surfaces (e.g., surfaces facing the top surface 370-2 of the assembly) of PIC 102 and XPU 118. If the insulating material 133-2 is formed to completely cover PIC 102 and XPU 118, the insulating material 133-2 may be removed using any suitable technique, including grinding, or etching, such as a wet etch, a dry etch (e.g., a plasma etch), a wet blast, or a laser ablation (e.g., using excimer laser). In some embodiments, the thickness of the insulating material 133-2 may be minimized to reduce the etching time required. In some embodiments, the top surface of the insulating material 133-2 may be planarized using any suitable process, such as CMP. In some embodiments, the insulating material 133-1 in the first layer 104-1 (e.g., deposited in FIG. 3C) is different material than the insulating material 133-2 in the second layer 104-2 (e.g., deposited in FIG. 3H). In some embodiments, the insulating material 133-1 in the first layer 104-1 (e.g., deposited in FIG. 3C) is a same material as the insulating material 133-2 in the second layer 104-2 (e.g., deposited in FIG. 3H).

Figure 3I:
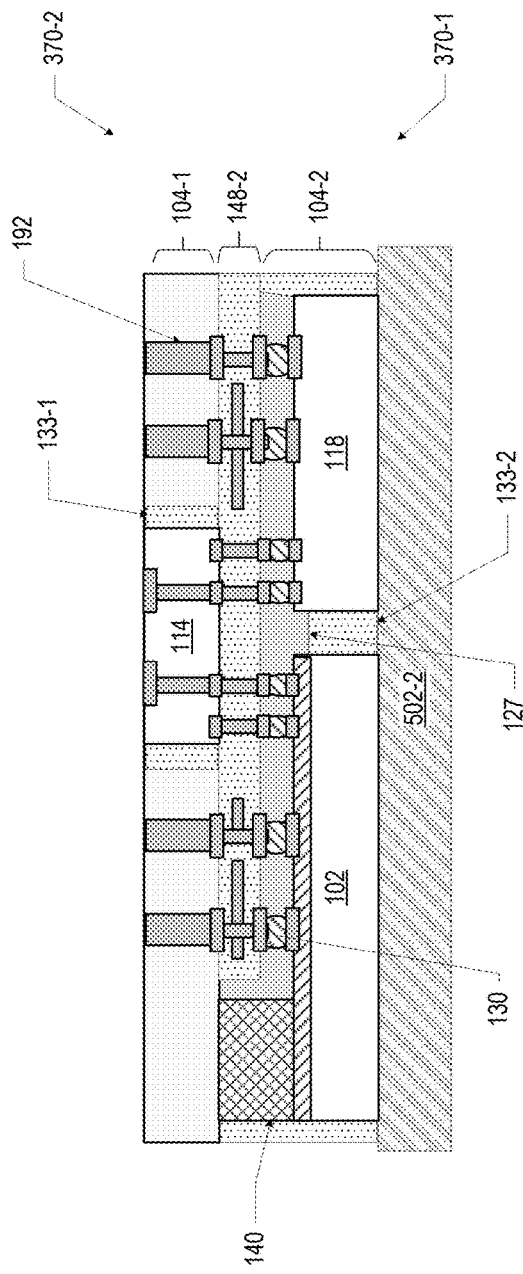

FIG. 3I illustrates an assembly subsequent to attaching a second carrier 502-2 to a top surface 370-2 of the assembly of FIG. 3H, removing the first carrier 502-1, and inverting the assembly. In some embodiments, the second carrier 502-2 may be omitted.

Figure 3J:
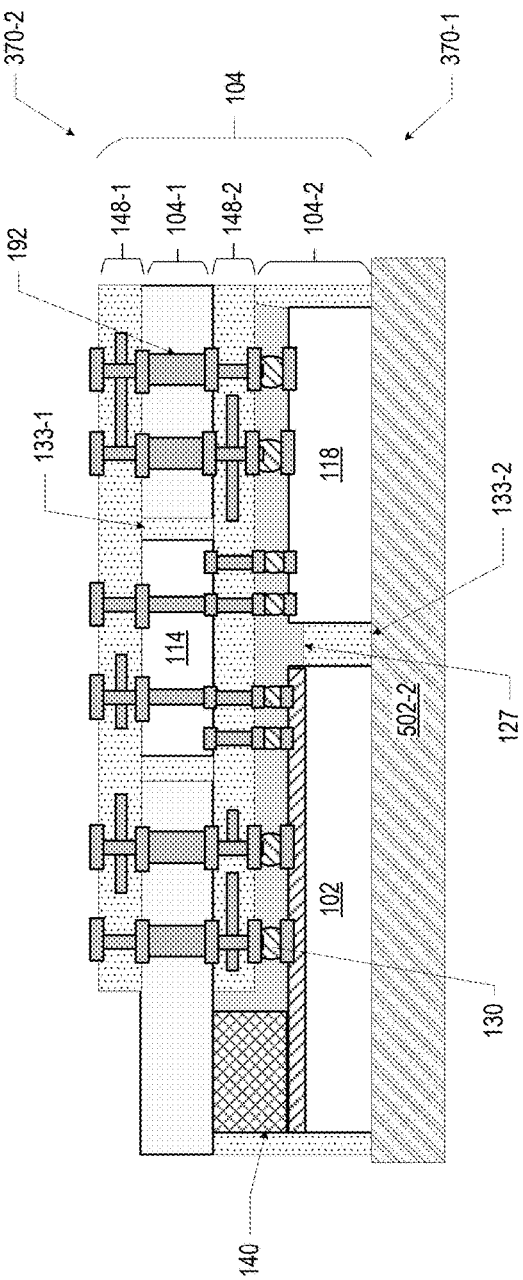

FIG. 3J illustrates an assembly subsequent to forming an RDL 148 (e.g., a first RDL 148-1 of FIG. 2) on a top surface 370-2 of the assembly and removing a portion of the RDL 148-2 from the top surface 370-2 to expose a portion of the glass substrate 103. The RDL 148-1 may be manufactured using any suitable technique, such as a PCB technique or an SAP technique. In some embodiments, the RDL 148-1 may be omitted. The RDL 148-1 may be removed using any suitable technique, such as by laser drilling, by pre-filling with a sacrificial material, or by other suitable techniques, including grinding, or etching, such as a wet etch, a dry etch (e.g., a plasma etch), a wet blast, or a laser ablation (e.g., using excimer laser) through a hard or soft mask. In some embodiments, a top surface of the glass substrate 103 (e.g., the exposed portion of the glass substrate 103 facing the top surface 370-2 of the assembly) may be subjected to grinding and polishing to form an optically smooth surface subsequent to removing the RDL 148-1. In some embodiments, the first RDL 148-1 may be omitted.

FIG. 3K illustrates an assembly subsequent to forming a waveguide 131 in the exposed portion of the glass substrate 103. The waveguide 131 may be formed using any suitable process, including laser writing. The waveguide 131 may be configured to convert light from traveling vertically from PIC 102 to travelling laterally, as shown in FIG. 1, or may be configured to transmit light vertically from PIC 102, as shown in FIG. 2. In some embodiments, the waveguide 131 may be formed prior to attachment of the optical surface component 140 (e.g., after the process described in FIG. 3F and before the process described in FIG. 3G), such that the optical surface component 140 may be optically aligned with the waveguide 131 when attached to the glass substrate 103.

FIG. 3L illustrates an assembly subsequent to removing the second carrier 502-2, inverting the assembly, and performing finishing operations, such as forming conductive contacts, for example, when the first RDL 148-1 is omitted (not shown), depositing solder resist (e.g., a passivation layer) (not shown), and depositing solder 134 on a bottom surface of the first RDL 148-1 (e.g., at the first surface 170-1 of the assembly) for coupling to a package substrate (e.g., the package substrate 124 of FIG. 1A and/or FIG. 2). If multiple assemblies are manufactured together, the assemblies may be singulated after removal of the second carrier 502-2. The assembly of FIG. 3L may itself be a photonic package 100, as shown. Further manufacturing operations may be performed on the photonic package 100 of FIG. 3L to form other photonic packages 100; for example, an optical component 137 may be optically coupled to the waveguide 131 at the lateral surface 142, as shown in FIG. 1A, or the bottom surface 170-1, as shown in FIG. 2, of the glass substrate 103. In another example, the solder 134 may be used to couple the photonic package 100 of FIG. 3L to a package substrate 124, and a TIM 154 and heat transfer structure 156 may be provided on the top surface of the photonic package 100 of FIG. 3L, similar to the photonic packages 100 of FIG. 1A and FIG. 2.

FIG. 4 is a flow diagram of an example method of fabricating photonic package 100, according to various embodiments of the present disclosure. At 402, a substrate 103 having TGVs 192 may be disposed on carrier 502 and a cavity 107 may be formed in the substrate 103 using laser drilling or any other suitable process.

At 404, EIC 114 (e.g., a first layer die) may be placed in the cavity 107, a top surface of the substrate 103 and EIC 114 may be encapsulated with an insulating material 133 (e.g., the insulating material 133-1 of FIG. 3), and the top surface of the insulating material 133 may be planarized using CMP or any other suitable process to form a first layer 140-1.

At 406, an RDL 148 (e.g., the RDL 148-2 of FIG. 3) may be formed on a top surface of the substrate 103 and the EIC 114, and a portion of the top surface of the substrate 103 may be revealed by removing part of the RDL 148 using any suitable process or protecting the portion of the substrate 103, for example, using a sacrificial material.

At 408, an optical surface component 140 may be coupled to the exposed portion of the substrate 103. The optical surface component 140 may be attached using any suitable means, such as optical glue. In some embodiments, the optical surface component 140 may be optically aligned prior to attachment. The optical bonding surface of the optical surface component 140 and/or substrate 103 may be polished to create an optically smooth surface.

At 410, PIC 102 and XPU 118 (e.g., second layer dies) may be attached to a top surface of the RDL 148. PIC 102 may be attached with an active surface 105 facing towards the carrier 502. Interconnects 130 may be formed to electrically couple PIC 102 and XPU 118 to EIC 114 and TGVs 192. The optical elements at the active surface 105 of PIC 102 may be optically coupled to the optical surface component 140 using any suitable means, such as optical glue. In some embodiments, an underfill material 127 may be disposed around the interconnects 130.

At 412, PIC 102 and XPU 118 may be encapsulated with the insulating material 133 and a top surface of the insulating material 133 may be planarized using CMP or any suitable process to form a second layer 104-2.

At 414, carrier 502 may be detached using any suitable process and an other RDL 148 (e.g., the RDL 148-1 of FIG. 3) may be formed, or surface finishing may be performed, on the exposed surface with a portion of the exposed surface of the substrate 103 remaining exposed.

At 416, form a waveguide 131 in the exposed portion of the substrate 103 that is optically aligned with the optical surface component 140 and the optical elements on the active side 105 of PIC 102. The waveguide 131 may be formed using laser writing or any suitable process.

Figure 5:
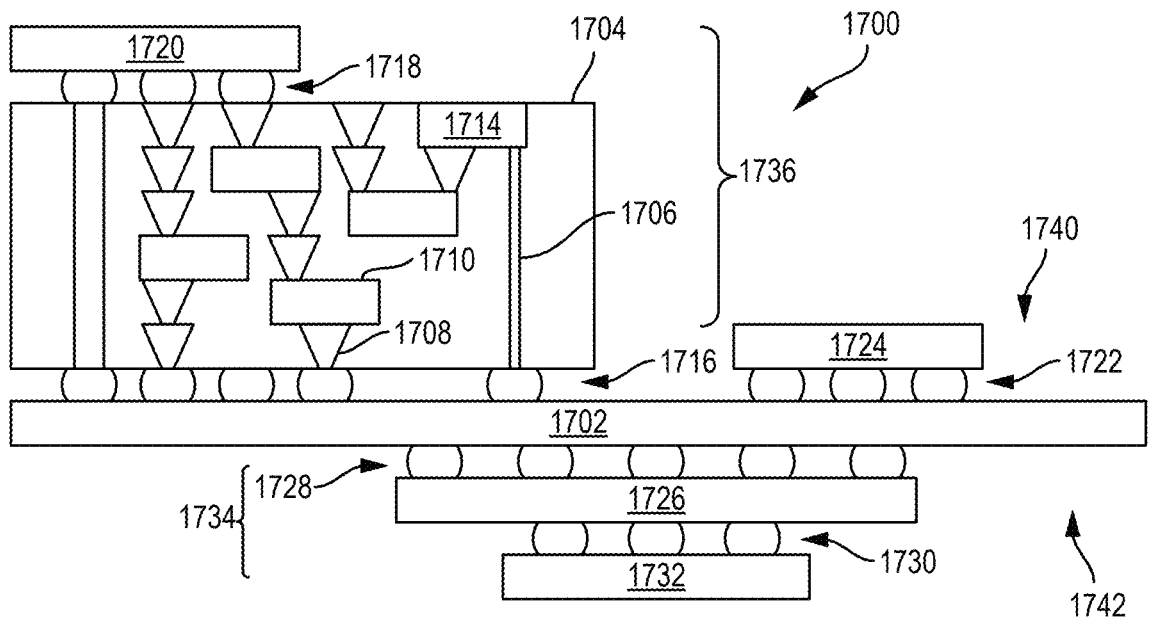
FIG. 5 is a cross-sectional side view of a device assembly that may include one or more photonic packages in accordance with any of the embodiments disclosed herein.
Figure 6:
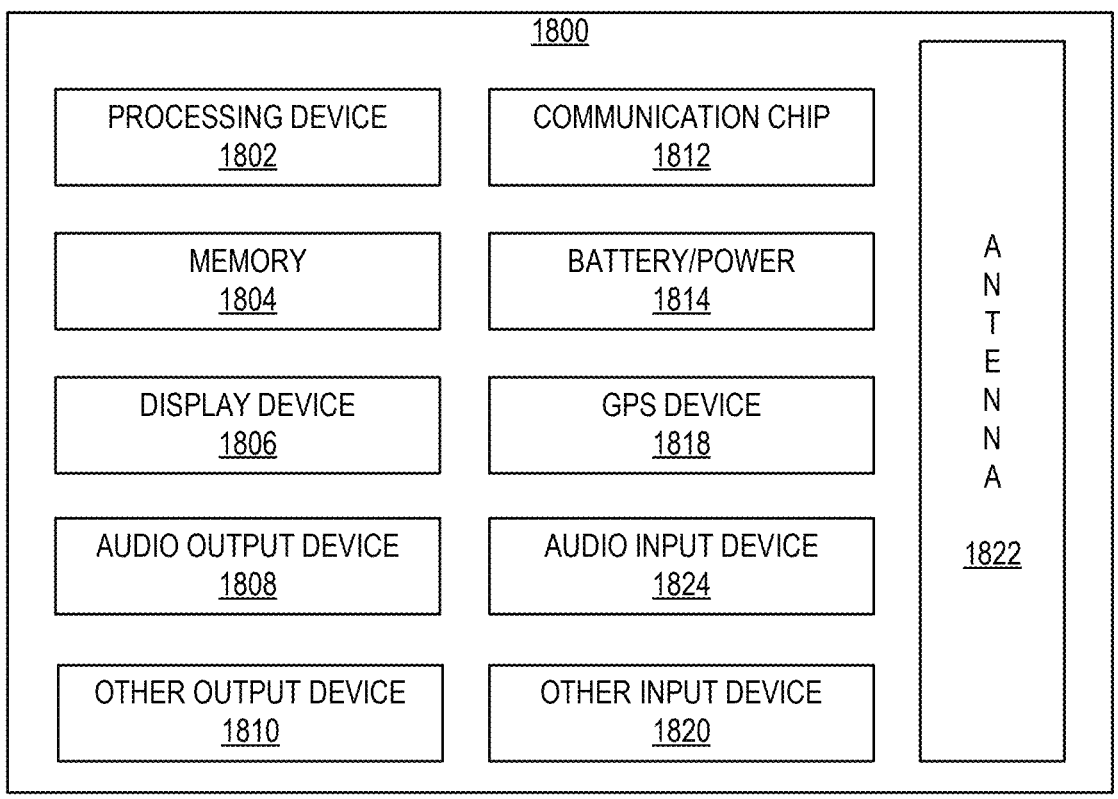
FIG. 6 is a block diagram of an example computing device that may include one or more photonic packages in accordance with any of the embodiments disclosed herein.

The photonic packages 100 disclosed herein may be included in any suitable electronic/photonic component. FIGS. 5 and 6 illustrate various examples of packages, assemblies, and devices that may be used with or include any of the photonic packages as disclosed herein.

FIG. 5 is a cross-sectional side view of an IC device assembly 1700 that may include any of the photonic packages 100 disclosed herein. In some embodiments, the IC device assembly 1700 may be a photonic packages 100. The IC device assembly 1700 includes a number of components disposed on a circuit board 1702 (which may be, e.g., a motherboard). The IC device assembly 1700 includes components disposed on a first face 1740 of the circuit board 1702 and an opposing second face 1742 of the circuit board 1702; generally, components may be disposed on one or both faces 1740 and 1742. Any of the IC packages discussed below with reference to the IC device assembly 1700 may take the form of any suitable ones of the embodiments of the photonic packages 100 disclosed herein.

In some embodiments, the circuit board 1702 may be a PCB including multiple metal layers separated from one another by layers of dielectric material and interconnected by electrically conductive vias. Any one or more of the metal layers may be formed in a desired circuit pattern to route electrical signals (optionally in conjunction with other metal layers) between the components coupled to the circuit board 1702. In other embodiments, the circuit board 1702 may be a non-PCB substrate. In some embodiments the circuit board 1702 may be, for example, a circuit board.

The IC device assembly 1700 illustrated in FIG. 5 includes a package-on-interposer structure 1736 coupled to the first face 1740 of the circuit board 1702 by coupling components 1716. The coupling components 1716 may electrically and mechanically couple the package-on-interposer structure 1736 to the circuit board 1702, and may include solder balls (as shown in FIG. 5), male and female portions of a socket, an adhesive, an underfill material, and/or any other suitable electrical and/or mechanical coupling structure.

The package-on-interposer structure 1736 may include an IC package 1720 coupled to an interposer 1704 by coupling components 1718. The coupling components 1718 may take any suitable form for the application, such as the forms discussed above with reference to the coupling components 1716. Although a single IC package 1720 is shown in FIG. 5, multiple IC packages may be coupled to the interposer 1704; indeed, additional interposers may be coupled to the interposer 1704. The interposer 1704 may provide an intervening substrate used to bridge the circuit board 1702 and the IC package 1720. The IC package 1720 may be or include, for example, a die, an IC device (e.g., the IC device 1600 of FIG. 13), or any other suitable component. Generally, the interposer 1704 may spread a connection to a wider pitch or reroute a connection to a different connection. For example, the interposer 1704 may couple the IC package 1720 (e.g., a die) to a set of ball grid array (BGA) conductive contacts of the coupling components 1716 for coupling to the circuit board 1702. In the embodiment illustrated in FIG. 5, the IC package 1720 and the circuit board 1702 are attached to opposing sides of the interposer 1704; in other embodiments, the IC package 1720 and the circuit board 1702 may be attached to a same side of the interposer 1704. In some embodiments, three or more components may be interconnected by way of the interposer 1704.

In some embodiments, the interposer 1704 may be formed as a PCB, including multiple metal layers separated from one another by layers of dielectric material and interconnected by electrically conductive vias. In some embodiments, the interposer 1704 may be formed of an epoxy resin, a fiberglass-reinforced epoxy resin, an epoxy resin with inorganic fillers, a ceramic material, or a polymer material such as polyimide. In some embodiments, the interposer 1704 may be formed of alternate rigid or flexible materials that may include the same materials described above for use in a semiconductor substrate, such as silicon, germanium, and other group III-V and group IV materials. The interposer 1704 may include metal interconnects 1708 and vias 1710, including but not limited to TSVs 1706. The interposer 1704 may further include embedded devices 1714, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the interposer 1704. The package-on-interposer structure 1736 may take the form of any of the package-on-interposer structures known in the art.

The IC device assembly 1700 may include an IC package 1724 coupled to the first face 1740 of the circuit board 1702 by coupling components 1722. The coupling components 1722 may take the form of any of the embodiments discussed above with reference to the coupling components 1716, and the IC package 1724 may take the form of any of the embodiments discussed above with reference to the IC package 1720.

The IC device assembly 1700 illustrated in FIG. 5 includes a package-on-package structure 1734 coupled to the second face 1742 of the circuit board 1702 by coupling components 1728. The package-on-package structure 1734 may include an IC package 1726 and an IC package 1732 coupled together by coupling components 1730 such that the IC package 1726 is disposed between the circuit board 1702 and the IC package 1732. The coupling components 1728 and 1730 may take the form of any of the embodiments of the coupling components 1716 discussed above, and the IC packages 1726 and 1732 may take the form of any of the embodiments of the IC package 1720 discussed above. The package-on-package structure 1734 may be configured in accordance with any of the package-on-package structures known in the art.

FIG. 6 is a block diagram of an example electrical device 1800 that may include one or more of the photonic packages 100 disclosed herein. For example, any suitable ones of the components of the electrical device 1800 may include one or more of the IC device assemblies 1700, IC devices 1600, or dies disclosed herein, and may be arranged in any of the photonic packages 100 disclosed herein. A number of components are illustrated in FIG. 6 as included in the electrical device 1800, but any one or more of these components may be omitted or duplicated, as suitable for the application. In some embodiments, some or all of the components included in the electrical device 1800 may be attached to one or more motherboards. In some embodiments, some or all of these components are fabricated onto a single system-on-a-chip (SoC) die.

Additionally, in various embodiments, the electrical device 1800 may not include one or more of the components illustrated in FIG. 6, but the electrical device 1800 may include interface circuitry for coupling to the one or more components. For example, the electrical device 1800 may not include a display device 1806, but may include display device interface circuitry (e.g., a connector and driver circuitry) to which a display device 1806 may be coupled. In another set of examples, the electrical device 1800 may not include an audio input device 1824 or an audio output device 1808, but may include audio input or output device interface circuitry (e.g., connectors and supporting circuitry) to which an audio input device 1824 or audio output device 1808 may be coupled.

The electrical device 1800 may include a processing device 1802 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more digital signal processors (DSPs), application-specific ICs (ASICs), central processing units (CPUs), graphics processing units (GPUs), cryptoprocessors (specialized processors that execute cryptographic algorithms within hardware), server processors, or any other suitable processing devices. The electrical device 1800 may include a memory 1804, which may itself include one or more memory devices such as volatile memory (e.g., dynamic random access memory (DRAM)), nonvolatile memory (e.g., read-only memory (ROM)), flash memory, solid state memory, and/or a hard drive. In some embodiments, the memory 1804 may include memory that shares a die with the processing device 1802. This memory may be used as cache memory and may include embedded dynamic random access memory (eDRAM) or spin transfer torque magnetic random access memory (STT-MRAM).

In some embodiments, the electrical device 1800 may include a communication chip 1812 (e.g., one or more communication chips). For example, the communication chip 1812 may be configured for managing wireless communications for the transfer of data to and from the electrical device 1800. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1812 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1812 may operate in accordance with a Global System for Mobile Communication (GSM), General Packet Radio Service (GPRS), Universal Mobile Telecommunications System (UMLS), High Speed Packet Access (HSPA), Evolved HSPA (E-HSPA), or LTE network. The communication chip 1812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1812 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1812 may operate in accordance with other wireless protocols in other embodiments. The electrical device 1800 may include an antenna 1822 to facilitate wireless communications and/or to receive other wireless communications (such as AM or FM radio transmissions).

In some embodiments, the communication chip 1812 may manage wired communications, such as electrical, optical, or any other suitable communication protocols (e.g., the Ethernet). As noted above, the communication chip 1812 may include multiple communication chips. For instance, a first communication chip 1812 may be dedicated to shorter-range wireless communications such as Wi-Fi or Bluetooth, and a second communication chip 1812 may be dedicated to longer-range wireless communications such as global positioning system (GPS), EDGE, GPRS, CDMA, WiMAX, LTE, EV-DO, or others. In some embodiments, a first communication chip 1812 may be dedicated to wireless communications, and a second communication chip 1812 may be dedicated to wired communications.

The electrical device 1800 may include battery/power circuitry 1814. The battery/power circuitry 1814 may include one or more energy storage devices (e.g., batteries or capacitors) and/or circuitry for coupling components of the electrical device 1800 to an energy source separate from the electrical device 1800 (e.g., AC line power).

The electrical device 1800 may include a display device 1806 (or corresponding interface circuitry, as discussed above). The display device 1806 may include any visual indicators, such as a heads-up display, a computer monitor, a projector, a touchscreen display, a liquid crystal display (LCD), a light-emitting diode display, or a flat panel display.

The electrical device 1800 may include an audio output device 1808 (or corresponding interface circuitry, as discussed above). The audio output device 1808 may include any device that generates an audible indicator, such as speakers, headsets, or earbuds.

The electrical device 1800 may include an audio input device 1824 (or corresponding interface circuitry, as discussed above). The audio input device 1824 may include any device that generates a signal representative of a sound, such as microphones, microphone arrays, or digital instruments (e.g., instruments having a musical instrument digital interface (MIDI) output).

The electrical device 1800 may include a GPS device 1818 (or corresponding interface circuitry, as discussed above). The GPS device 1818 may be in communication with a satellite-based system and may receive a location of the electrical device 1800, as known in the art.

The electrical device 1800 may include an other output device 1810 (or corresponding interface circuitry, as discussed above). Examples of the other output device 1810 may include an audio codec, a video codec, a printer, a wired or wireless transmitter for providing information to other devices, or an additional storage device.

The electrical device 1800 may include an other input device 1820 (or corresponding interface circuitry, as discussed above). Examples of the other input device 1820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The electrical device 1800 may have any desired form factor, such as a computing device or a hand-held, portable or mobile computing device (e.g., a cell phone, a smart phone, a mobile internet device, a music player, a tablet computer, a laptop computer, a netbook computer, an ultrabook computer, a personal digital assistant (PDA), an ultra mobile personal computer, etc.), a desktop electrical device, a server, or other networked computing component, a printer, a scanner, a monitor, a set-top box, an entertainment control unit, a vehicle control unit, a digital camera, a digital video recorder, or a wearable computing device. In some embodiments, the electrical device 1800 may be any other electronic device that processes data.

The following paragraphs provide various examples of the embodiments disclosed herein.

Example 1 is a photonic assembly, including a glass substrate, having a first surface, an opposing second surface, and a lateral surface substantially perpendicular to the first and second surfaces, wherein the glass substrate includes a waveguide and a through-glass-substrate via (TGV); an integrated circuit (IC) nested in the glass substrate; a photonic integrated circuit (PIC) at the second surface of the glass substrate, wherein an active side of the PIC faces the second surface of the glass substrate, and wherein the active side of the PIC is electrically coupled to the IC and the TGV; a first optical component between the second surface of the glass substrate and the active side of the PIC, wherein the first optical component is optically coupled to the active side of the PIC and to the waveguide in the glass substrate; and a second optical component optically coupled to the waveguide in the glass substrate.

Example 2 may include the subject matter of Example 1, and may further specify that the first optical component is a passthrough structure, a glass block, or an index matching polymer.

Example 3 may include the subject matter of Example 1 or 2, and may further specify that the second optical component is an optical lens, an isolator, or a fiber coupler.

Example 4 may include the subject matter of any of Examples 1-3, and may further specify that the second optical component is optically coupled to the waveguide at the lateral surface of the glass substrate.

Example 5 may include the subject matter of Example 4, and may further include a package substrate at the first surface of the glass substrate and electrically coupled to the IC, the TGV, and the active side of the PIC.

Example 6 may include the subject matter of Example 1, and may further specify that the second optical component is optically coupled to the waveguide at the first surface of the glass substrate.

Example 7 may include the subject matter of Example 6, and may further include: a package substrate at the first surface of the glass substrate, wherein the package substrate is electrically coupled to the IC, the TGV, and the active side of the PIC, and wherein the package substrate includes an aperture and the second optical component is aligned with the aperture.

Example 8 may include the subject matter of any of Examples 1-7, and may further specify that the waveguide in the glass substrate is a laser written waveguide.

Example 9 may include the subject matter of any of Examples 1-8, and may further specify that the PIC includes a backside opposite the active side, and the photonic assembly and may further include a heat transfer structure at the backside of the PIC.

Example 10 may include the subject matter of Example 5, and may further include a heat transfer structure embedded in the package substrate.

Example 11 may include the subject matter of any of Examples 1-10, and may further include a processor circuit at the second surface of the glass substrate and electrically coupled to the IC.

Example 12 may include the subject matter of any of Examples 1-11, and may further include a redistribution layer at the second surface of the glass substrate between the PIC and the glass substrate.

Example 13 is a photonic assembly, including an integrated circuit (IC) in a first layer, wherein the first layer includes a substrate having a first surface, an opposing second surface, and a lateral surface substantially perpendicular to the first and second surfaces, wherein the substrate includes a waveguide between the first and second surfaces, and wherein and the IC is nested in a cavity in the substrate; a photonic integrated circuit (PIC) in a second layer, wherein the second layer is on the first layer and an active surface of the PIC faces the first layer, and wherein the IC is electrically coupled to the active surface of the PIC; and an optical component optically coupled to the active surface of the PIC and optically coupled to the waveguide in the substrate at the second surface.

Example 14 may include the subject matter of Example 13, and may further specify that a material of the optical component includes an index matching polymer, an optical epoxy, a polyimide, an acrylic, or benzene and cyclobutane.

Example 15 may include the subject matter of Examples 13 or 14, and may further specify that the optical component is a first optical component, and the photonic assembly may further include a second optical component at the first surface of the substrate and optically coupled to the waveguide.

Example 16 may include the subject matter of Example 15, and may further specify that the second optical component is a glass block, a fiber array block, a fiber coupler, an optical lens, an isolator, a planar lens, a micro-lens, a glass block with a reflector, a glass block with a curved surface, a mirror reflector, a multi-directional reflector, a waveguide, or a laser written waveguide.

Example 17 may include the subject matter of Examples 13 or 14, and may further specify that the optical component is a first optical component, and the photonic assembly and may further include a second optical component at the lateral surface of the substrate and optically coupled to the waveguide.

Example 18 may include the subject matter of Example 17, and may further specify that the second optical component is a glass block, a fiber array block, a fiber coupler, an optical lens, an isolator, a planar lens, a micro-lens, a glass block with a reflector, a glass block with a curved surface, a mirror reflector, a multi-directional reflector, a waveguide, or a laser written waveguide.

Example 19 is a method of manufacturing a photonic assembly, including attaching a glass substrate with a through-glass-substrate via (TGV) to a carrier; forming a cavity in the glass substrate; placing an integrated circuit (IC) in the cavity; encapsulating the IC with an insulating material and planarizing; optically coupling an optical component to a top surface of the glass substrate; electrically coupling an active surface of a photonic integrated circuit (PIC) to the top surface of the IC and to the TGV and optically coupling an optical element on the active surface of the PIC to the optical component; encapsulating the PIC with the insulating material and planarizing; removing the carrier; and forming a waveguide in the glass substrate optically coupled to the optical component and the optical element on the active surface of the PIC.

Example 20 may include the subject matter of Example 19, and may further specify that the optical component is a first optical component, and the method and may further include attaching a second optical component to the glass substrate and optically coupling the second optical component to the waveguide.

The invention claimed is:

1. A photonic assembly, comprising:
a glass substrate, having a first surface, an opposing second surface, and a lateral surface substantially perpendicular to the first and second surfaces, wherein the glass substrate includes a waveguide and a through-glass-substrate via (TGV);
an integrated circuit (IC) nested in the glass substrate;
a photonic integrated circuit (PIC) at the second surface of the glass substrate, wherein an active side of the PIC faces the second surface of the glass substrate, and wherein the active side of the PIC is electrically coupled to the IC and the TGV;
a first optical component between the second surface of the glass substrate and the active side of the PIC, wherein the first optical component is optically coupled to the active side of the PIC and to the waveguide in the glass substrate; and
a second optical component optically coupled to the waveguide in the glass substrate.

2. The photonic assembly of claim 1, wherein the first optical component is a passthrough structure, a glass block, or an index matching polymer.

3. The photonic assembly of claim 1, wherein the second optical component is an optical lens, an isolator, or a fiber coupler.

4. The photonic assembly of claim 1, wherein the second optical component is optically coupled to the waveguide at the lateral surface of the glass substrate.

5. The photonic assembly of claim 4, further comprising:
a package substrate at the first surface of the glass substrate and electrically coupled to the IC, the TGV, and the active side of the PIC.

6. The photonic assembly of claim 1, wherein the second optical component is optically coupled to the waveguide at the first surface of the glass substrate.

7. The photonic assembly of claim 6, further comprising:
a package substrate at the first surface of the glass substrate, wherein the package substrate is electrically coupled to the IC, the TGV, and the active side of the PIC, and wherein the package substrate includes an aperture and the second optical component is aligned with the aperture.

8. The photonic assembly of claim 1, wherein the waveguide in the glass substrate is a laser written waveguide.

9. The photonic assembly of claim 1, wherein the PIC includes a backside opposite the active side, and the photonic assembly further comprising:
a heat transfer structure at the backside of the PIC.

10. The photonic assembly of claim 5, further comprising:
a heat transfer structure embedded in the package substrate.

11. The photonic assembly of claim 1, further comprising:
a processor circuit at the second surface of the glass substrate and electrically coupled to the IC.

12. The photonic assembly of claim 1, further comprising:
a redistribution layer at the second surface of the glass substrate between the PIC and the glass substrate.

13. A photonic assembly, comprising:
an integrated circuit (IC) in a first layer, wherein the first layer includes a substrate having a first surface, an opposing second surface, and a lateral surface substantially perpendicular to the first and second surfaces, wherein the substrate includes a waveguide between the first and second surfaces, and wherein and the IC is nested in a cavity in the substrate;
a photonic integrated circuit (PIC) in a second layer, wherein the second layer is on the first layer and an active surface of the PIC faces the first layer, and wherein the IC is electrically coupled to the active surface of the PIC; and
an optical component optically coupled to the active surface of the PIC and optically coupled to the waveguide in the substrate at the second surface.

14. The photonic assembly of claim 13, wherein a material of the optical component includes an index matching polymer, an optical epoxy, a polyimide, an acrylic, or benzene and cyclobutane.

15. The photonic assembly of claim 13, wherein the optical component is a first optical component, and the photonic assembly further comprising:
a second optical component at the first surface of the substrate and optically coupled to the waveguide.

16. The photonic assembly of claim 15, wherein the second optical component is a glass block, a fiber array block, a fiber coupler, an optical lens, an isolator, a planar lens, a micro-lens, a glass block with a reflector, a glass block with a curved surface, a mirror reflector, a multi-directional reflector, a waveguide, or a laser written waveguide.

17. The photonic assembly of claim 13, wherein the optical component is a first optical component, and the photonic assembly further comprising:
a second optical component at the lateral surface of the substrate and optically coupled to the waveguide.

18. The photonic assembly of claim 17, wherein the second optical component is a glass block, a fiber array block, a fiber coupler, an optical lens, an isolator, a planar lens, a micro-lens, a glass block with a reflector, a glass block with a curved surface, a mirror reflector, a multi-directional reflector, a waveguide, or a laser written waveguide.

* * * * *